(12) United States Patent
Christopher et al.

(10) Patent No.: US 9,514,002 B2
(45) Date of Patent: Dec. 6, 2016

(54) INCREMENTAL BACKUPS USING RETIRED SNAPSHOTS

(71) Applicant: VMware, Inc., Palo Alto, CA (US)

(72) Inventors: Kevin Scott Christopher, Sunnyvale, CA (US); Trevor John Thompson, Los Altos Hills, CA (US)

(73) Assignee: VMware, Inc., Palo Alto, CA (US)

(*) Notice: Subject to any disclaimer, the term of this patent is extended or adjusted under 35 U.S.C. 154(b) by 398 days.

(21) Appl. No.: 14/026,850

(22) Filed: Sep. 13, 2013

(65) Prior Publication Data

US 2015/0081994 A1 Mar. 19, 2015

(51) Int. Cl.
*G06F 11/14* (2006.01)
*G06F 17/30* (2006.01)

(52) U.S. Cl.
CPC ....... *G06F 11/1458* (2013.01); *G06F 11/1451* (2013.01); *G06F 17/30* (2013.01); *G06F 2201/815* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 6,374,366 B1* | 4/2002 | Maffezzoni | ......... | G06F 11/1458 714/27 |
| 6,829,617 B2* | 12/2004 | Sawdon | ......... | G06F 11/1435 |
| 7,111,014 B2* | 9/2006 | Sawdon | ......... | G06F 11/1435 |
| 7,284,150 B2* | 10/2007 | Ma | ......... | G06F 11/1451 711/161 |
| 7,657,582 B1* | 2/2010 | Cram | ......... | G06F 11/1435 707/640 |
| 7,680,836 B2* | 3/2010 | Anderson | ......... | G06F 17/30088 707/999.202 |
| 7,680,842 B2* | 3/2010 | Anderson | ......... | G06F 17/30088 707/999.204 |
| 7,769,972 B2* | 8/2010 | Kaushik | ......... | G06F 11/1456 711/154 |
| 7,774,315 B1* | 8/2010 | Galker | ......... | G06F 11/1456 707/644 |
| 7,814,272 B2* | 10/2010 | Barrall | ......... | G06F 3/0607 711/114 |
| 7,814,273 B2* | 10/2010 | Barrall | ......... | G06F 3/0607 711/114 |
| 7,818,531 B2* | 10/2010 | Barrall | ......... | G06F 3/0607 711/170 |
| 7,831,821 B2* | 11/2010 | Chen | ......... | G06F 11/1451 713/2 |
| 7,870,356 B1* | 1/2011 | Veeraswamy | ......... | G06F 3/0607 711/100 |
| 7,873,782 B2* | 1/2011 | Terry | ......... | G06F 3/0607 707/823 |
| 7,877,554 B2* | 1/2011 | Bonwick | ......... | G06F 11/2094 707/697 |

(Continued)

OTHER PUBLICATIONS

VMware, Inc., "Designing Backup Solutions for VMware vSphere", Jul. 7, 2009, 25 pages, available at http://www.vmware.com/support/developer/vddk/vadp_vsphere_backup111.pdf.

*Primary Examiner* — Christopher D Birkhimer
(74) *Attorney, Agent, or Firm* — Patterson & Sheridan LLP

(57) ABSTRACT

Systems and methods for performing backups to a storage device are provided. For virtual disks of a virtual machine, snapshots are used to backup data periodically to a storage device. A disk virtualization layer "retires" data blocks associated with a snapshot, while retaining a list of block addresses, for comparison in future backup operations. The retired snapshot can be compared against future snapshots to generate incremental backups without occupying storage space with data blocks that have already been copied to another storage device.

20 Claims, 10 Drawing Sheets

(56) References Cited

U.S. PATENT DOCUMENTS

| | | | |
|---|---|---|---|
| 7,882,071 B2* | 2/2011 | Fachan | G06F 17/30088 707/639 |
| 7,899,989 B2* | 3/2011 | Moore | G06F 3/0617 711/114 |
| 7,925,630 B1* | 4/2011 | Krishnamurthy | G06F 11/1471 707/640 |
| 7,945,726 B2* | 5/2011 | Faibish | G06F 3/061 711/112 |
| 7,949,692 B2* | 5/2011 | Lemar | G06F 11/1435 707/822 |
| 7,953,704 B2* | 5/2011 | Anderson | G06F 17/3015 707/649 |
| 7,958,154 B2* | 6/2011 | Nelson | G06F 17/3056 707/793 |
| 8,010,493 B2* | 8/2011 | Anderson | G06F 17/30088 707/638 |
| 8,015,156 B2* | 9/2011 | Anderson | G06F 17/30088 707/639 |
| 8,032,498 B1* | 10/2011 | Armangau | G06F 17/30088 707/690 |
| 8,099,391 B1* | 1/2012 | Monckton | G06F 11/1451 707/647 |
| 8,156,303 B2* | 4/2012 | Barrall | G06F 3/0607 711/170 |
| 8,239,655 B2* | 8/2012 | Goggin | G06F 3/061 711/203 |
| 8,281,093 B1* | 10/2012 | Krishnan | G06F 11/1469 711/162 |
| 8,307,177 B2* | 11/2012 | Prahlad | G06F 11/1453 711/162 |
| 8,356,013 B2* | 1/2013 | Fachan | G06F 17/30088 707/648 |
| 8,364,639 B1* | 1/2013 | Koryakina | G06F 11/1458 707/639 |
| 8,412,688 B1* | 4/2013 | Armangau | G06F 17/30088 707/690 |
| 8,443,166 B2 | 5/2013 | Czezatke et al. | |
| 8,448,044 B2* | 5/2013 | Dhuse | H04L 9/085 365/184 |
| 8,473,947 B2* | 6/2013 | Goggin | G06F 3/061 718/1 |
| 8,543,761 B2 | 9/2013 | Goldick | |
| 8,719,286 B1* | 5/2014 | Xing | G06F 11/1451 707/755 |
| 2004/0059878 A1 | 3/2004 | Madany | |
| 2005/0138312 A1* | 6/2005 | Kubo | G06F 11/1466 711/162 |
| 2006/0010490 A1* | 1/2006 | Makita | G06F 11/1458 726/9 |
| 2006/0112222 A1* | 5/2006 | Barrall | G06F 3/0607 711/114 |
| 2006/0129875 A1* | 6/2006 | Barrall | G06F 3/0607 714/6.12 |
| 2006/0143380 A1* | 6/2006 | Barrall | G06F 3/0607 711/114 |
| 2006/0174157 A1* | 8/2006 | Barrall | G06F 3/0607 714/6.12 |
| 2006/0184587 A1 | 8/2006 | Federwisch et al. | |
| 2006/0206536 A1* | 9/2006 | Sawdon | G06F 11/1435 |
| 2007/0266037 A1* | 11/2007 | Terry | G06F 3/0607 |
| 2008/0034176 A1* | 2/2008 | Akutsu | G06F 11/2058 711/162 |
| 2008/0046432 A1* | 2/2008 | Anderson | G06F 17/3015 |
| 2008/0046475 A1* | 2/2008 | Anderson | G06F 17/3015 |
| 2008/0046476 A1* | 2/2008 | Anderson | G06F 17/3015 |
| 2008/0059541 A1* | 3/2008 | Fachan | G06F 17/3015 |
| 2008/0114951 A1* | 5/2008 | Lee | G06F 11/1469 711/162 |
| 2008/0172536 A1* | 7/2008 | Kaushik | G06F 11/1456 711/162 |
| 2009/0006728 A1* | 1/2009 | Green | G06F 9/4418 711/104 |
| 2009/0055604 A1* | 2/2009 | Lemar | G06F 11/1435 711/161 |
| 2009/0125577 A1* | 5/2009 | Kodama | G06F 11/1458 709/201 |
| 2009/0158020 A1* | 6/2009 | Chen | G06F 11/1451 713/2 |
| 2010/0011239 A1 | 1/2010 | Kawaguchi et al. | |
| 2010/0049930 A1 | 2/2010 | Pershin et al. | |
| 2010/0070725 A1* | 3/2010 | Prahlad | G06F 11/1453 711/162 |
| 2010/0161556 A1* | 6/2010 | Anderson | G06F 17/3015 707/638 |
| 2010/0161557 A1* | 6/2010 | Anderson | G06F 17/3015 707/638 |
| 2010/0228913 A1* | 9/2010 | Czezatke | G06F 11/1451 711/112 |
| 2010/0235591 A1* | 9/2010 | Akutsu | G06F 11/2058 711/154 |
| 2011/0035565 A1* | 2/2011 | Barrall | G06F 3/0607 711/170 |
| 2011/0087635 A1* | 4/2011 | Fachan | G06F 17/30088 707/649 |
| 2011/0113194 A1* | 5/2011 | Terry | G06F 3/0607 711/114 |
| 2011/0161298 A1* | 6/2011 | Grobman | G06F 11/1451 707/649 |
| 2011/0252208 A1* | 10/2011 | Ali | G06F 11/1451 711/162 |
| 2011/0258408 A1* | 10/2011 | Akutsu | G06F 11/2058 711/162 |
| 2012/0066182 A1 | 3/2012 | Chang et al. | |
| 2012/0166757 A1* | 6/2012 | Volvovski | G06F 17/30 711/206 |
| 2012/0166867 A1* | 6/2012 | Volvovski | G06F 17/30 714/6.22 |
| 2012/0166868 A1* | 6/2012 | Volvovski | G06F 17/30 714/6.22 |
| 2012/0304006 A1 | 11/2012 | Kawaguchi | |
| 2012/0331223 A1* | 12/2012 | Bello | G06F 3/061 711/114 |
| 2013/0019067 A1 | 1/2013 | Vilayannur et al. | |
| 2013/0061014 A1* | 3/2013 | Prahlad | G06F 11/1453 711/162 |
| 2013/0103644 A1* | 4/2013 | Shoens | G06F 17/3023 707/638 |
| 2013/0227208 A1 | 8/2013 | Yano et al. | |
| 2013/0239215 A1* | 9/2013 | Kaufman | G06F 21/566 726/24 |

* cited by examiner

INCREMENTAL BACKUPS USING RETIRED SNAPSHOTS

CROSS-REFERENCE TO RELATED APPLICATION(S)

This application is related to co-pending U.S. patent application Ser. No. 14/026,789, filed on the same day as this application, and also entitled "Incremental Backups Using Retired Snapshots", the entire contents of which are incorporated by reference herein.

BACKGROUND

Traditional backup software uses a driver that tracks changes made to a persistent storage device, also called a hard disk herein. The changes are used to backup only the parts of the disk that have changed since the last backup. However, such drivers require specialized code for each operating system. Also, implementation of the drivers is complex to ensure that not a single change is missed—this is particularly hard during a boot process.

Additionally, present backup methods do not handle complex situations in an efficient manner. For example, some existing backup routines use an archive bit where one bit is designated to a file, and the bit is turned on when data in that file is changed. A backup just retrieves and replicates files that have the corresponding bit turned on. When the backup is completed, all the archive bits are cleared. A drawback is that a break down would occur (due to resetting of the bits) when an additional backup application uses this interface. Even worse, the problem would not be detected by the additional backup application. Also, the archive bit corresponds to an entire file, and thus if one part of a file is changed, then all of it is backed up.

Other existing backup methods use redo logs. Once a redo log is created, all changes to a disk are captured in the redo log. When a backup is to be performed, data stored in the redo log is used for the backup. A new redo log is then created and the prior one is committed into the base disk. However, this method is costly in terms of additional operations and additional disk space required, particularly if there is more than one application performing a backup. This costly overhead stems, for example, from the fact that redo logs also preserve the prior state of the disk.

Using timestamps also requires relatively heavy storage and/or processing. Also, if the backup is taken from an alternate location, such as a dedicated backup server, issues could arise if the clocks between a virtual machine whose data is being backed up and a backup server are not tightly synchronized: If the clock on the backup server is ahead of the clock in the virtual machine, backups might be incomplete.

Another backup method uses checksums. While this method can deliver incremental image level backups, its scalability is limited. For example, every time a backup is performed, the entire disk to be backed up has to be read by the backup application. Hence, the load on the data source is not reduced compared to performing a full backup every time. Also, reliable checksums (e.g. cryptographic hashes) can be computationally expensive to compute.

SUMMARY

One or more embodiments of the present disclosure provide a method, system, and computer-readable storage medium having executable instructions for generating incremental backups for a virtual disk. In one embodiment, the method includes receiving a request to take a snapshot of a first virtual disk associated with a virtual machine. The first virtual disk may include a first plurality of data blocks and a first block allocation map having a first plurality of entries associated with the first plurality of data blocks. The method further includes generating a second virtual disk comprising a reference to the first virtual disk and a second block allocation map having a second plurality of entries corresponding to the first plurality of entries. The method includes storing a copy of the first plurality of data blocks in a second storage device, and modifying an indication associated with the first virtual disk, wherein the indication represents that the first virtual disk has been retired. The method further includes determining changes between the first virtual disk and the second virtual disk based on a comparison of the second block allocation map against the first block allocation map, and generating a backup comprising the determined changes in the virtual disk.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

DETAILED DESCRIPTION

One or more embodiments disclosed herein provide methods, systems, and computer programs for tracking changes of virtual devices, and making incremental backups using the tracked changes. Further, embodiments save storage space on the physical device underlying the virtual device by putting the set of tracked changes in a state (i.e., retired) where the changes are remembered without having to store the data underlying the changes. As such, next time an incremental backup is performed, the state of the disk at last backup is available, however conventional known techniques require the old state to effectively keep around all the data that was on the previous backup, just so that the state of the previous backup can be remembered.

Figure 1:
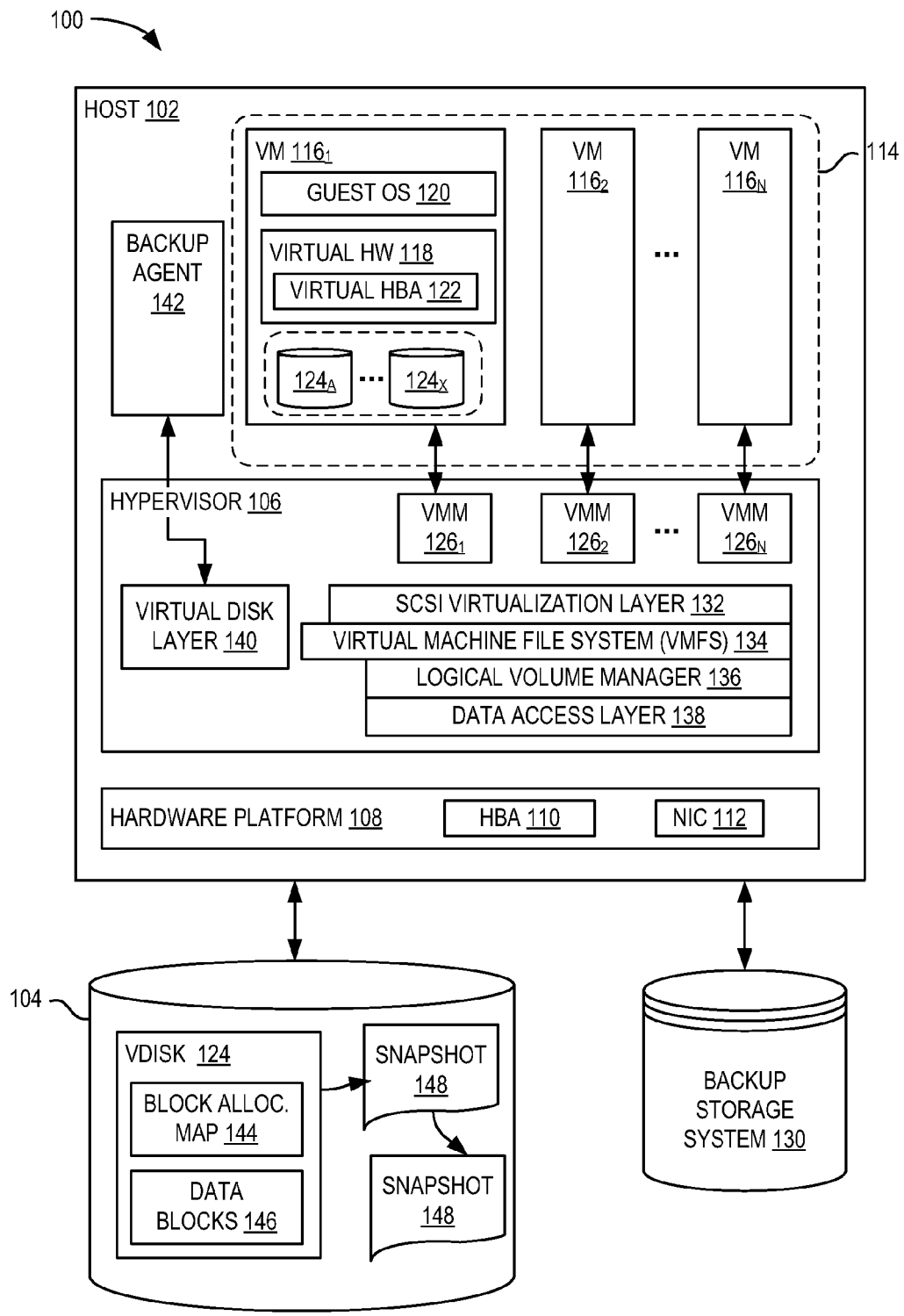
FIG. 1 is a block diagram that illustrates a computer system in which one or more embodiments may be utilized.

FIG. 1 is a block diagram that illustrates a virtualized computer architecture 100 according to one or more embodiments of the present disclosure. Virtualized computer architecture 100 includes one or more hosts 102 connected to a storage system 104, for example, through a network (not shown). Host 102 may comprise a general purpose computer system having one or more virtual machines accessing data stored on storage system 104. Host 102 may be constructed on a conventional, typically server-class, hardware platform. Storage system 104 may be a shared storage system having one or more storage arrays of any type such as a network-attached storage (NAS) filer or a block-based device over a storage area network (SAN). While storage system 104 is typically made up of a plurality of disks, other forms of storage, such as solid-state non-volatile storage devices, may be used, and the use of the term, "disk" herein, should therefore not be construed as limited only to rotating disk storage media, but also what is become known as solid state disks, or "SSDs."

As shown in FIG. 1, host 102 includes a disk interface, depicted as a Host Bus Adapter (HBA) 110, and a network interface, depicted as a network interface card (NIC) 112, which enable host 102 to connect to storage system 104. As further shown in FIG. 1, a hypervisor 106 is installed on top of hardware platform 108 and supports a virtual machine execution space 114 within which multiple virtual machines (VMs) $116_1$-$116_N$ may be instantiated and executed. Each such virtual machine $116_1$-$116_N$ implements a virtual hardware platform 118 that supports the installation of a guest operating system (OS) 120 which is capable of executing one or more applications (not shown). Examples of a guest OS 120 include any of the well-known commodity operating systems, such as Microsoft Windows, Linux, and the like. In each instance, guest OS 120 includes a native file system layer, for example, either an NTFS or an ext3FS type file system layer. These file system layers interface with virtual hardware platforms 118 to access, from the perspective of guest operating systems 120, a data storage HBA, which in reality, is virtual HBA 122 implemented by virtual hardware platform 118 that provides the appearance of disk storage support (in reality, virtual disks $124_A$-$124_X$) to enable execution of guest OS 120 transparent to the virtualization of the system hardware. In certain embodiments, virtual disks $124_A$-$124_X$ may appear to support, from the perspective of guest OS 120, the SCSI standard for connecting to the virtual machine or any other appropriate hardware connection interface standard known to those with ordinary skill in the art, including IDE, ATA, and ATAPI.

Although, from the perspective of guest operating systems 120, file system calls initiated by such guest operating systems 120 to implement file system-related data transfer and control operations appear to be routed to virtual disks $124_A$-$124_X$ for final execution, in reality, such calls are processed and passed through virtual HBA 122 to adjunct virtual machine monitor (VMM) layers $126_1$-$126_N$ that implement the virtual system support needed to coordinate operation with hypervisor 106. In particular, a HBA emulator of each VMM 126 functionally enables the data transfer and control operations to be correctly handled by hypervisor 106 which ultimately passes such operations through its various layers to true hardware HBAs 110 or NIC 112 that connect to storage system 104. Assuming a SCSI-supported virtual device implementation (although those with ordinary skill in the art will recognize the option of using other hardware interface standards), SCSI virtualization layer 132 of hypervisor 106 receives a data transfer and control operation (in the form of SCSI commands, for example, intended for a SCSI-compliant virtual disk) from VMM layers $126_1$-$126_N$, and converts them into file system operations that are understood by virtual machine file system (VMFS) 134 in order to access a file stored in one or more logical unit numbers (LUNs) in storage system 104 under the management of VMFS 134 that represents the SCSI-compliant virtual disk. In one embodiment, the file representing the virtual disk (e.g., virtual disk $124_A$) conforms to the VMware Virtual Disk (VMDK) file format promulgated by VMware, Inc. for virtual disks, although it should be recognized that alternative virtual disk file formats may be used in other embodiments.

SCSI virtualization layer 132 then issues these file system operations to VMFS 134. VMFS 134, in general, manages creation, use, and deletion of files (e.g., such as .vmdk files representing virtual disks) stored on LUNs exposed by storage system 104. VMFS 134, converts the file system operations received from SCSI virtualization layer 132 to volume (e.g. LUN) block operations, and provides the volume block operations to logical volume manager 136. Logical volume manager (LVM) 136 is typically implemented as an intermediate layer between the driver and file system layers, and supports volume oriented virtualization and management of the LUNs accessible through HBAs 110 and NIC 112. LVM 136 issues raw SCSI operations to a data access layer 138 based on the LUN block operations. Data access layer 138 includes a device access layer, which discovers storage system 104, and applies command queuing and scheduling policies to the raw SCSI operations, and a device driver, which understands the input/output interface of HBAs 110 and NIC 112 interfacing with storage array 104, and sends the raw SCSI operations from the device access layer to HBAs 110 or NIC 112 to be forwarded to storage array 104.

It should be recognized that the various terms, layers and categorizations used to describe the virtualization components in FIG. 1 may be referred to differently without departing from their functionality or the spirit or scope of the invention. For example, VMMs 126 may be considered separate virtualization components between VMs 116 and hypervisor 106 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 118 may be merged with and into VMM 126 such that virtual host bus adapter 122 is removed from FIG. 1 (i.e., since its functionality is effectuated by a host bus adapter emulator within VMM 126).

According to one embodiment, VMFS 134 may include a virtual disk layer 140 that provides applications with access to virtual disk storage. Virtual disk layer 140, in response to requests from applications via an application programming interface (API), may create virtual machine disk files (e.g., .vmdk files), provide read and write access to a virtual disk, and create snapshots of virtual disks. By exposing functionality of virtual disk storage, virtual disk layer 140 enables a wide variety of uses, for example, the creation of virtual machine disk files to store backup of physical images, read access to virtual disks for off-line centralized anti-virus scanning of virtual machines, write access to virtual disks, for off-line centralized patching of virtual machines, read access to virtual disks for off-line software package analysis of virtual machines. In one particular implementation, virtual disk layer 140 may be a pre-packaged library or API having a plurality of functions and methods that may be invoked by applications, and an example of which includes Virtual Disk Development Kit (VDDK) made available by VMware, Inc. of Palo, Alto, Calif.

In one embodiment, a backup agent 142 is configured to backup data (e.g., virtual disks) of virtualized computing architecture 100 to a backup storage system 130. As shown in FIG. 1, backup agent 142 may use virtual disk layer 140 to access virtual disks 124 and backup virtual disk data to backup storage system 130. Backup storage system 130 may be similar to storage system 104, and may any of suitable persistence storage system, including disk arrays, solid-state drives, and tape drives. While backup storage system 130 is depicted as connected directly to host 102, it should be recognized that intermediary communication agents and components may be arranged between host 102 and backup system 130, including a communications network and proxy backup agents. Further, while backup agent 142 is depicted as an application executing on host 102, it should be recognized that backup agent 142 may be executing in one of the VMs of host 102 or in an external server communicatively connected to host 102.

Each virtual disk 124 may behave as a block-addressable device that retains content of blocks of data 146, distinguished by a logical block address which abstracts the "physical" location of data in regions of the virtual disk. Virtual disk 124 can be accessed by a VM for read and write operations using the logical block addresses. In one embodiment, a virtual disk 124 includes a data structure, depicted in FIG. 1 as a block allocation map 144, which maps each logical block address to a corresponding physical address. During operation, the logical block addresses specified by read and write operations are translated to corresponding physical block addresses using block allocation map 144.

Figure 2:
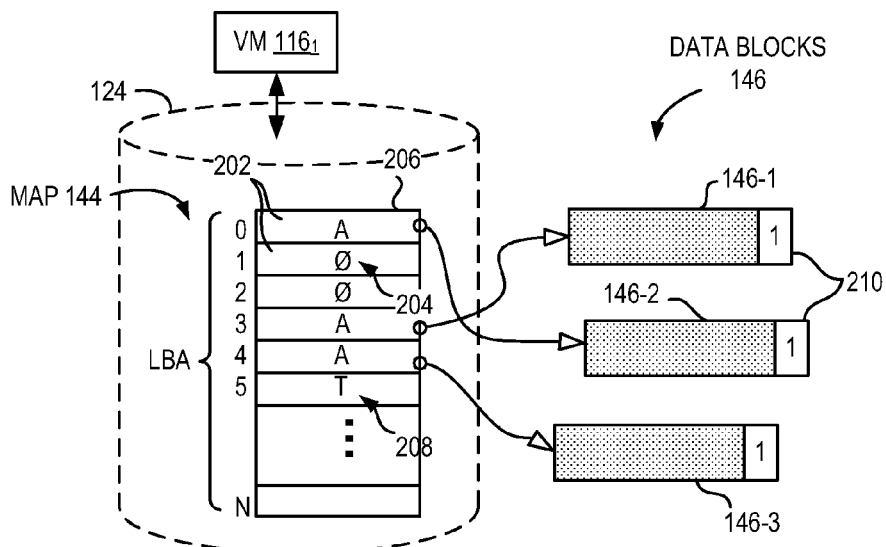
FIG. 2 is a block diagram depicting a block-addressable device, such as a virtual disk, having a block allocation map that maps logical block addresses to physical locations with storage, according to one embodiment of the present disclosure.

According to one embodiment, virtual disks 124 may comprise independent allocation maps 144 that reference a shared pool of data blocks, as shown in greater detail in FIG. 2. According to another embodiment, virtual disks 124 may comprise allocation maps that reference each other, and whose data blocks are independent, described later.

Retired Snapshots of Virtual Disks Having Allocation Maps Referencing Shared Pool of Data Blocks FIG. 2 is a block diagram depicting one embodiment of a block-addressable device for a virtual machine (e.g., VM 116₁), such as a virtual disk 124, having a block allocation map 144 that maps logical block addresses to physical locations with storage. Block allocation map 144 includes a plurality of entries 202 that represent a logical storage space for retaining content of blocks of data. Each entry 202 has a logical block address (LBA) that specifies a location within the logical storage space. In the embodiment shown in FIG. 2, the plurality of entries 202 have a logical block address based on a sequential index of block allocation map 144, for example, LBA-0 to LBA-N; although other addressing schemes may be used.

Each entry 202 of the block allocation map may have an address field 206 for a physical block address (PBA) that specifies the storage region containing the corresponding data block 146. For example, in one implementation, each entry 202 may contain a 64-bit physical block address specifying a guest physical location (i.e., physical from the VM's perspective) of data block 146. It should be recognized that the physical block addresses for data blocks 146 may be non-contiguous and distributed across the underlying storage device. In the example shown in FIG. 2, LBA-0 points to the location for data block 146-2; LBA-3 points to the location for data block 146-1; LBA-4, data block 146-3.

In certain embodiments, for space efficiency, virtual disk 124 may record and retain only those blocks which have been explicitly written (i.e., allocated), and returning all zeros for read operations on unwritten blocks (i.e., unallocated blocks), although other implementations of "thin allocation" may be used. To implement such functionality, entries 202 in block allocation map 144 are marked as allocated or unallocated. In one embodiment, an entry 202 may be marked as allocated simply by storing a physical block address in field 206. An entry 202 may be marked as unallocated by storing a special or reserved value in physical block address field 206, for example, a Ø or NULL address 204 shown in FIG. 2.

According to one embodiment, block allocation map 144 may be extended to include indications that a data block had been previously allocated and is now de-allocated, in contrast to a data block has never been allocated. In some embodiments, an entry 202 may be marked as previously allocated, now de-allocated by storing a special or reserved value 208, different from the special value indicating a never-allocated data block (i.e., Ø character 204). In the example shown in FIG. 2, LBA-5 contains a special value 208 represented by the character T indicating the corresponding data block had been trimmed.

In one embodiment, each data block 146 is associated with a reference count 210 that indicates a number of entries 202 of block allocation maps that reference the corresponding data block 146. It should be appreciated that data blocks 146 of storage 104 may be shared by multiple virtual disks 124, and reference counts 210 enable embodiments of the present disclosure to track related blocks across allocation maps, as described in greater detail later.

While one particular embodiment of block allocation map 144 is depicted in FIG. 2, it should be recognized that other implementations of the data structure may be utilized and are within the scope of the present disclosure. For example, rather than store special or reserved values within physical block address to indicate unallocated data blocks, entries in block allocation map 144 may have a separate, dedicated field for indicating state of a data block (i.e., allocated, never allocated, previously allocated). In another example, while reference count 210 is depicted as part of a data structure for a data block 146, reference counts for data blocks 146 may be maintained in a separate, centralized data structure.

To read a (logical) block from a virtual disk 124 having an independent block allocation map 144 referencing shared data blocks 146, virtual disk layer 140 determines whether block allocation map 144 has an allocated data block 146 for the requested block. If so, virtual disk layer 140 returns that data block 146. Otherwise, virtual disk layer 140 returns a block of zeros.

To write a (logical) block to virtual disk 124, virtual disk layer 140 first receives a request to write data to a block having a given logical address. Virtual disk layer 140 determines whether the block is unallocated based on block allocation map 144. If unallocated, virtual disk layer 140 allocates a new data block 146, updates the corresponding entry 202 in block allocation map 144 with the physical block address of the new data block, sets an associated reference count to 1, and writes the data. Otherwise, if the logical block has an allocated data block already, virtual disk layer 140 determines whether the reference count associated with the existing data block is equal to 1. If so, virtual disk layer 140 overwrites data of the existing data block with the new data of the received write request. If the associated reference count is not equal to 1 (i.e., other block allocation maps still refer to this data block), virtual disk layer 140 decrements the associated reference count 210 of the existing data block, allocates a new block, updates the corresponding entry in block allocation map 144 with the physical block address of the new data block, sets the reference count to 1, and writes the data.

To delete a disk, virtual disk layer 140 is configured to, for each block in an allocation map 144, de-allocate a data block if the associated reference count 210 is equal to 1. In one implementation, the associated reference count may be zeroed upon de-allocation. In another implementation, free data blocks are maintained in a central list or tree, and reference counts associated with free blocks in the central list or tree are implicitly zero due to the blocks' inclusion within the list of free blocks. After completion of this process, virtual disk layer 140 de-allocates block allocation map 144 and then deletes the disk.

According to one embodiment, virtual disk layer 140 is configured to generate a snapshot 148 of one or more virtual disks 124 that represents the state of a virtual machine at the time the snapshot was taken. In some embodiments, snapshot 148 may include files and memory state of a virtual machine's guest operating system 120, and may include settings and configuration of a virtual machine 116 and its virtual hardware 118. In some embodiments, snapshot 148 may be stored within storage device 104 as a set of files, for example, in the same directory as other files that comprise a virtual machine 116.

In some embodiments, virtual disk layer 140 may quickly and efficiently make a snapshot 148 of virtual disk 124 by recording the logical block addresses of each block that has been written as of that moment in time. Virtual disk layer 140 may be further configured to capture changes to virtual disk 124 after that particular moment in time by making a snapshot 148 at that moment, then using copy-on-write (COW) techniques to record subsequently written blocks in the list of addresses (e.g., block allocation map) for snapshot 148 and not the parent virtual disk (or vice versa). In some embodiments, virtual disk layer 140 may be configured to quickly and efficiently compare a snapshot 148 to a parent disk (e.g., virtual disk 124) to discover the list of addresses of changed data blocks 146. These features of snapshots and comparing snapshots are used, for example, to facilitate incremental backups, which back up only those files and data that have changed since the last backup, whether the last backup was a full backup or a previous incremental backup.

To create an incremental backup, a backup agent (e.g., backup agent 142) periodically makes snapshots of the virtual disk, compares the new snapshot to an earlier-created snapshot, and copies the changed data blocks to another storage device, such as backup storage system 130. However, using known techniques, the incremental backup process must retain the latest snapshot until the time of a next backup, to be a basis for comparison with the next backup. This retention may be considered wasteful, since the incremental backup made a copy of exactly that retained data to backup storage system 130 already.

Embodiments of the present disclosure provide a technique for "retiring" data blocks associated with a snapshot, while retaining the list of block addresses, for future "compare" operations. The described technique solves the problem of duplicate data retention discussed above by providing a snapshot that can be compared against another snapshot (i.e., a future snapshot), while not occupying storage space with data blocks that have already been copied to another storage device (i.e., backup system 130).

Figure 3:
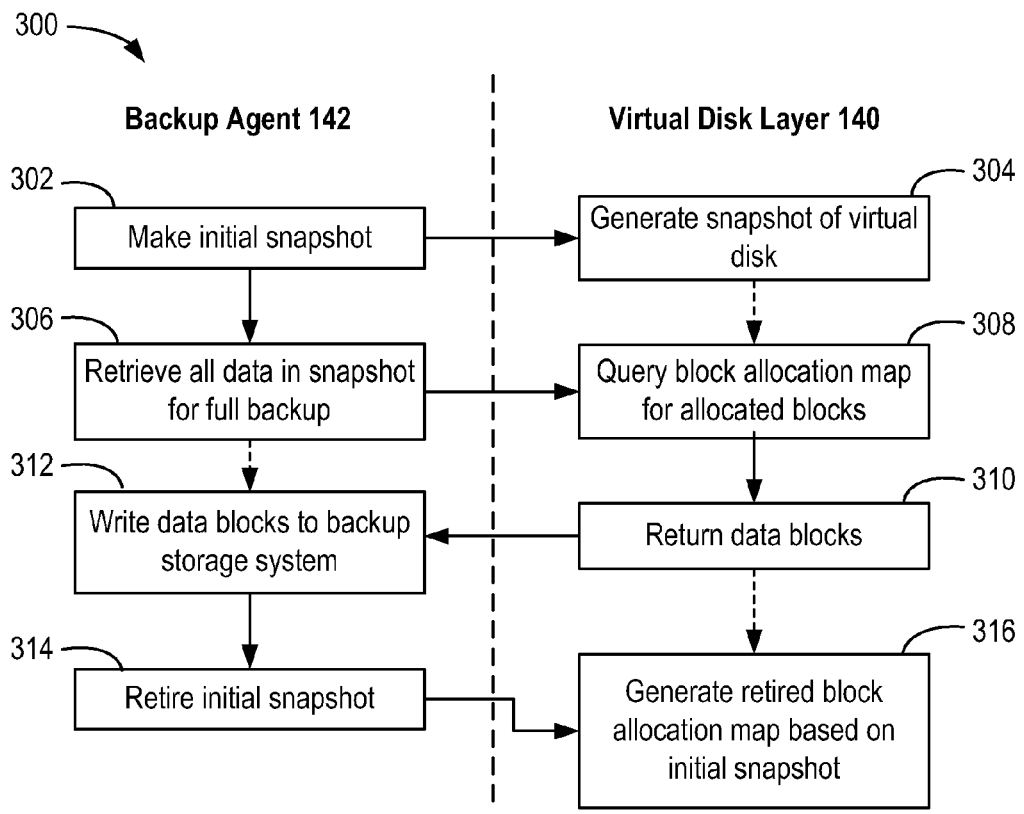
FIG. 3 is a flow diagram illustrating a method for performing a full back up of data in one or more virtual disks, according to one embodiment of the present disclosure.
Figure 4:
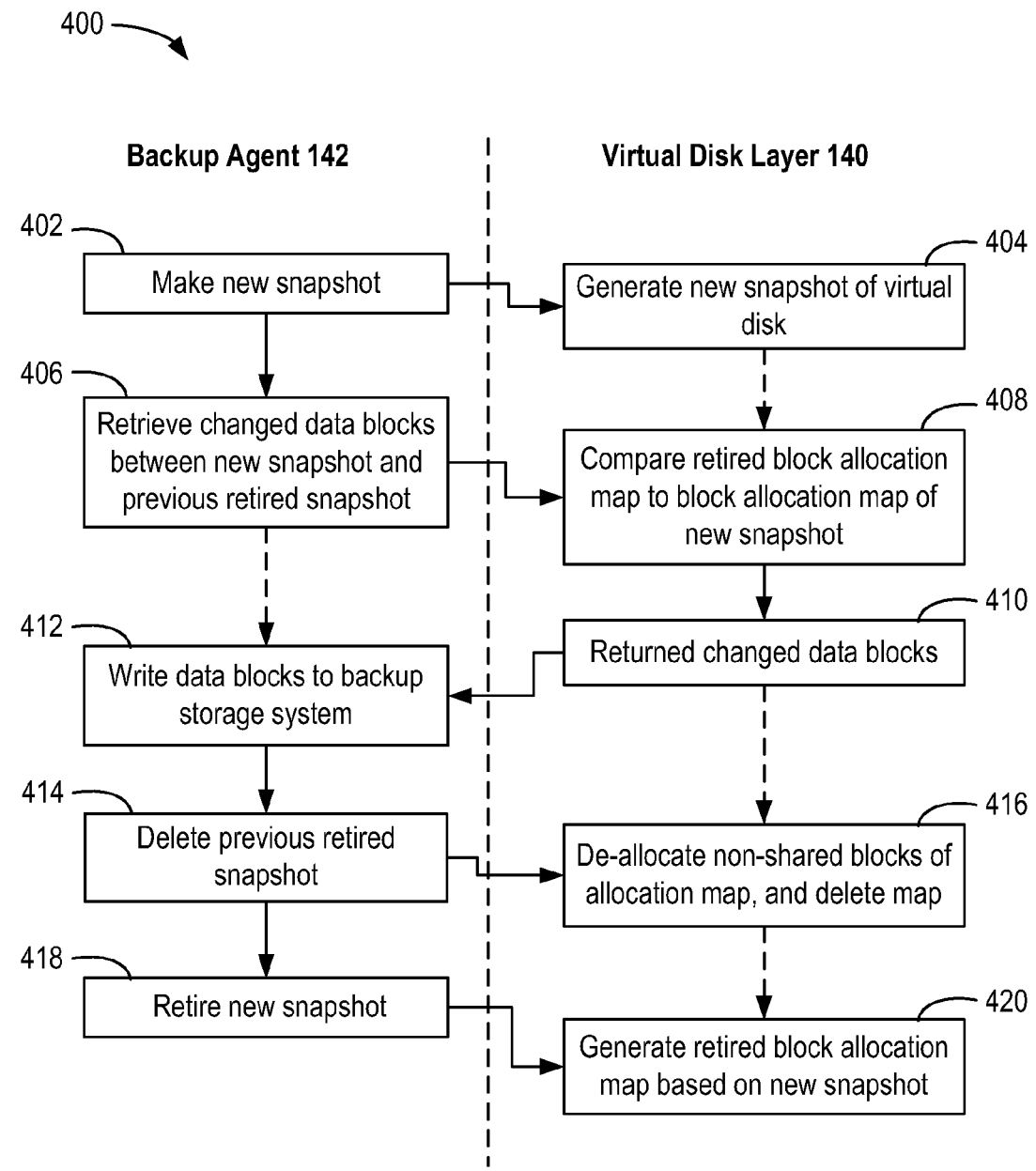
FIG. 4 is a flow diagram illustrating a method for performing an incremental backup of data in one or more virtual disks, according to one embodiment of the present disclosure.

FIGS. 3 and 4 illustrate methods 300 and 400 for performing backups of data in one or more virtual disks of a virtual machine, according to embodiments of the present disclosure. Backup agent 142 periodically, or responsive to user input, performs a full or incremental backup process to copy data from virtual disks 124 onto backup storage system 130. Further, FIGS. 5A to 5D are block diagrams depicting one example of backup operations and will be referenced in conjunction with the methods 300 and 400 shown in FIGS. 3 and 4. While methods 300 and 400 are described in conjunction with the system shown in FIG. 1, it should be recognized that other systems may be used to perform the described methods.

FIG. 3 is a flow diagram illustrating a method 300 for performing a full back up of data in one or more virtual disks, according to one embodiment of the present disclosure. The method 300 involves backup agent 142 making at least one full backup of a virtual disk 124 selected as a subject for the backup procedure. At step 302, periodically or responsive to user input, backup agent 142 makes an initial snapshot of virtual disk 124 that represents the state of virtual disk 124 at the time the snapshot was taken (i.e., at $t=t_1$). In some embodiments, backup agent 142 may take the initial snapshot using virtual disk layer 140 (e.g., via API call), although other mechanisms may be used, such as invoking a backup script within the target virtual machine.

At step 304, virtual disk layer 140 generates a snapshot of the target virtual disk. According to one embodiment, virtual disk layer 140 creates a second virtual disk having a block allocation map copied from the target virtual disk. Virtual disk layer 140 steps through the copied block allocation map and, for each allocated block, increment the associated reference count to represent that the second virtual disk references the same data blocks.

Figure 5A:
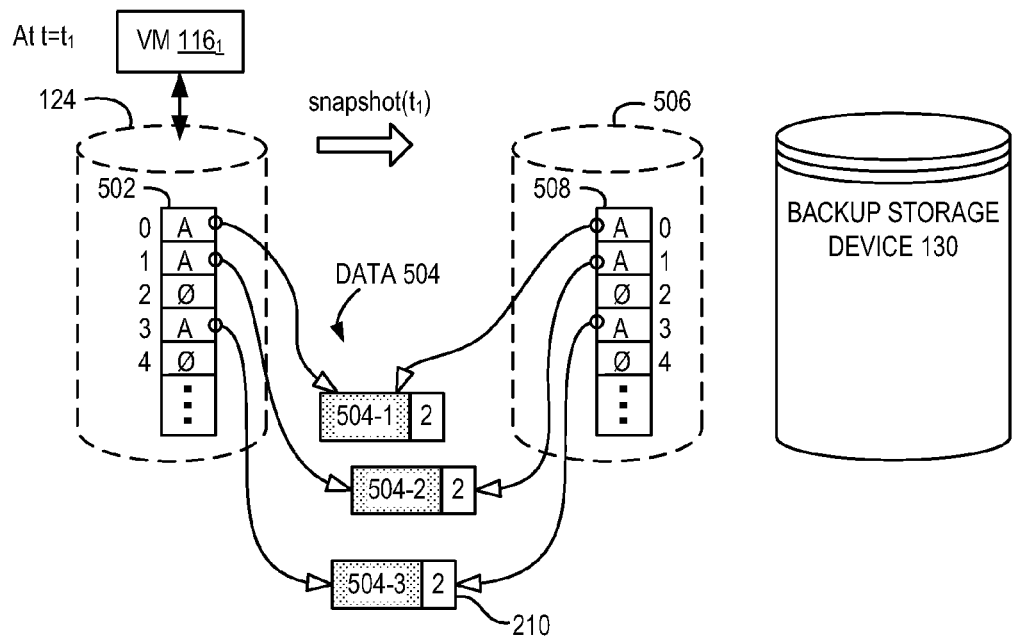
FIGS. 5A to 5D are block diagrams depicting backup operations of virtual disks, according to one embodiment of the present disclosure.

In the example shown in FIG. 5A, virtual disk 124 includes a block allocation map 502 that references a plurality of shared data blocks 504 which are similar to block allocation map 144 and data blocks 146 of FIG. 1. Block allocation map 502 includes entries that map logical block addresses (e.g., LBA-0 to LBA-4) to physical block addresses for data blocks 504. For simplicity of illustration, entries of block allocation map are notated as A, T, or Ø. In FIGS. 5A to 5D, the "A" notation represents that the data block corresponding to the block allocation map entry is allocated (i.e., entry contains a physical block address). The "Ø" notation represents that the data block corresponding to the block allocation map has never been allocated (i.e., entry contains the special value 204). The "T" notation represents that the data block corresponding to the block allocation map entry had been previously allocated and is now de-allocated (i.e., entry contains the special value 208). In FIG. 5A, logical blocks LBA-0, LBA-1, and LBA-3 have been written to and map to allocated data blocks 504, and as such are depicted with A notations; logical blocks LBA-2 and LBA-4 are unallocated and are therefore depicted with Ø notations.

As shown in FIG. 5A, virtual disk layer 140 generates a second virtual disk 506 with a block allocation map 508 which is a copy of block allocation map 506 for virtual disk 124. Physical block addresses of block allocation map 508 point to (the same) physical data blocks 504 that are shared between the virtual disks. As shown, reference counts associated with each of allocated data blocks 504 are incremented (e.g., from 1 to 2). While FIG. 5A depicts virtual disk 124 as being left as the current disk and the second virtual disk being designated as the snapshot, it should be recognized that in alternative embodiments, virtual disk layer 140 may associate the second virtual disk as current disk of VM $116_1$, in place of virtual disk 124, and designate the target virtual disk as snapshot 148.

At step 306, backup agent 142 uses virtual disk layer 140 to retrieve all data from the initial snapshot 506 for a full backup. It should be appreciated that virtual disk layer 140 handles the extraction of data from the virtual disks of a virtual machine. At step 308, responsive to an access request for all data from the initial snapshot, virtual disk layer 140 queries the block allocation map of the initial snapshot and, at step 310, returns every data block that is marked as allocated. As described earlier, virtual disk layer 140 walks through the block allocation map and retrieves data blocks 504 for any logical blocks marked as "allocated" within the block allocation map (e.g., LBA-0, LBA-1, LBA-3 in FIG. 5A) and returns zeros for an unallocated blocks (e.g., LBA-2, LBA-4).

Figure 5B:
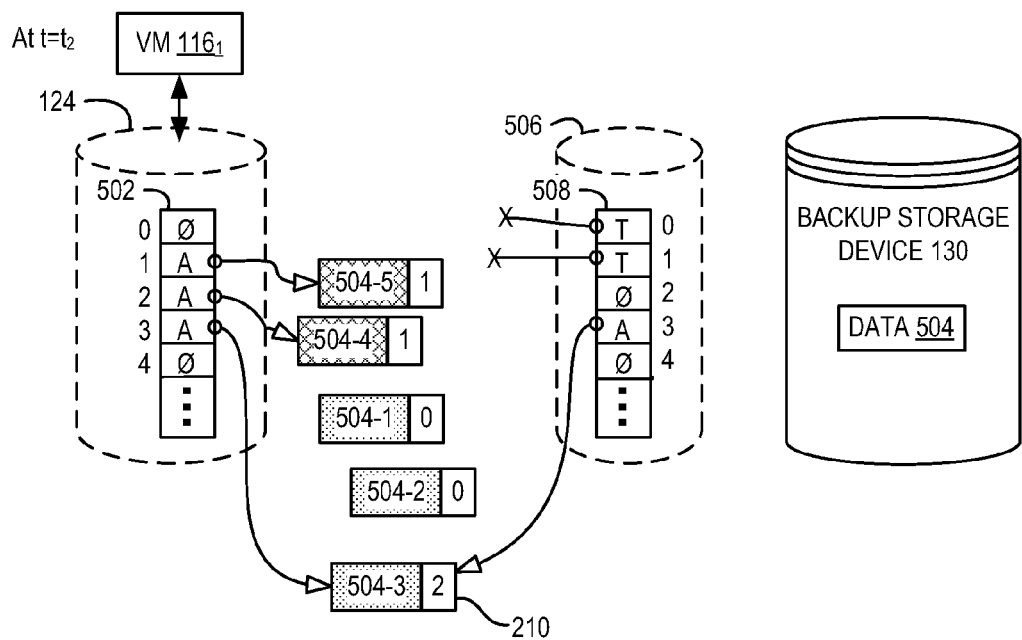

At step 312, backup agent 142 copies the returned data blocks to backup storage system 130, thereby forming a full backup. As shown in FIG. 5B, backup storage device 130 includes a copy of data blocks 504.

At step 314, backup agent 142 requests virtual disk layer 140 to "retire" the initial snapshot. At step 316, virtual disk layer 140 generates a data structure herein referred to as a "retired block allocation map" for the initial now-retired snapshot. Virtual disk layer 140 may delete data blocks associated the snapshot as part of the retirement process. In some embodiments, virtual disk layer 140 uses a "TRIM" primitive to delete data blocks, which causes corresponding entries in block allocation map for those deleted data blocks to be marked as unallocated, specifically, previously-allocated now de-allocated. Virtual disk layer 140 may retain an internal copy of the retired block allocation map for later use, for example, in compare or delete operations.

According to one embodiment, to retire a snapshot or virtual disk, virtual disk layer 140 steps through each entry in the block allocation map of the snapshot, and for each block, if the associated reference count is equal to 1, de-allocates the data block and marks the block as trimmed within the block allocation map. In cases where a data block is shared among block allocation maps of virtual disks (i.e., the associated reference count is greater than 1), virtual disk layer 140 does not change the associated reference count, and retains untrimmed shared blocks in the block allocation map of the snapshot so that untrimmed shared data blocks can be seen as unchanged in later compare operations, described later. In some embodiments, virtual disk layer 140 may register retired disks with untrimmed blocks in a list, and the retirement process described above (e.g., in step 316) may be performed periodically in the background on all retired disks on the list. In such an embodiment, retiring a snapshot may have no immediate effect on a block allocation map, other than marking the disk as retired or registering the retired disk to the list. Rather, data blocks get trimmed as activity on the live disk (e.g., virtual disk 124) causes reference counts on referenced blocks to decrement to 1, according to the operations to write a logical block to virtual disk described above. Virtual disk layer 140 retains responsibility for trimming retired snapshots, for example, by a background process that trigger scans of retired snapshots.

Figure 5C:
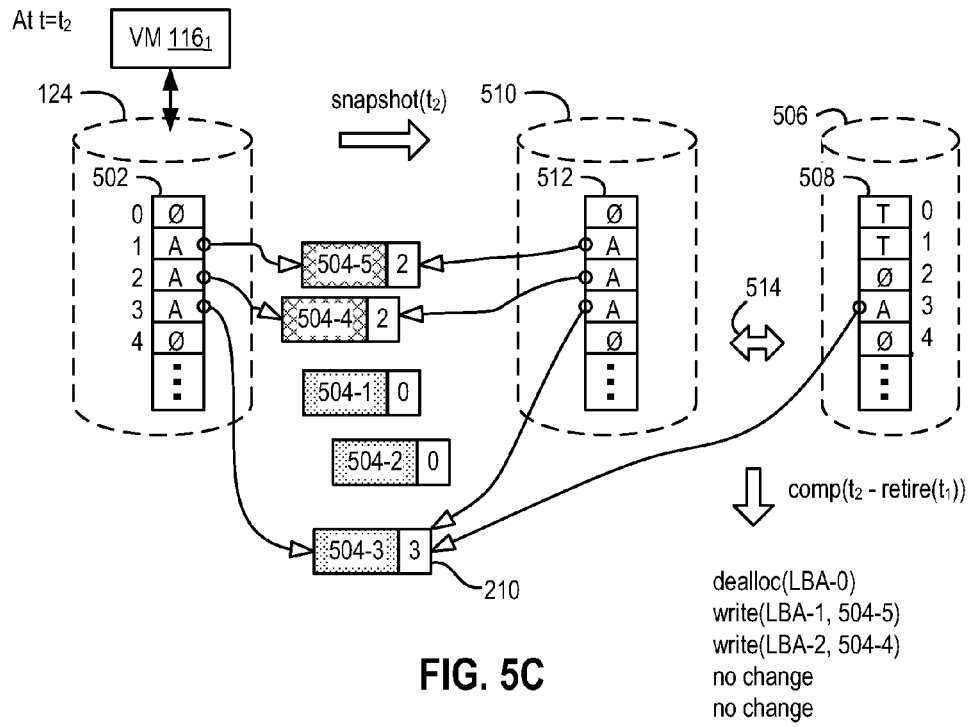

Retired snapshot 506 having a retired block allocation map 508 is depicted in greater detail in FIG. 5C. As shown, data blocks 504-1 and 504-2 have been "trimmed" from retired snapshot 506 subsequent to being de-allocated in first virtual disk 124 (in the case of block 504-1) or being replaced with a copy-on-write block (in the case of block 504-2), as a copy of this data is retained at backup storage device 130. Retired block allocation map 508 is similar to the original block allocation map 502, except that some data blocks marked as allocated (i.e., with entries of block allocation map 502 having "A") are now marked as previously allocated, now de-allocated (i.e., with "T"). It has been determined that by having separate states that distinguish between "trimmed" and unallocated data blocks, retired snapshots 506 may be used subsequently for comparison purposes.

Under conventional backup approaches, an entire previous snapshot would be retained and used for comparison when the next incremental backup is taken. In another conventional technique, this snapshot would be deleted after the backup is complete (that is, changes made after taking the snapshot are saved to the parent snapshot disk) and a traditional backup agent retains a copy of the snapshot data for later comparison. In both cases, storage space is wasted on retaining this past data. Accordingly, embodiments of the present disclosure provide an improved technique for backing up data that reduces the amount of storage space needed to perform backups. The use of the retired snapshot saves storage space because the data blocks themselves no longer need to be retained by the backup agent or virtual disk. Further, although some existing devices might have a trim facility, conventional trim functionality does not distinguish "unallocated" blocks from "trimmed" blocks, and therefore a snapshot trimmed on such a device would not be useful for comparison.

FIG. 4 is a flow diagram illustrating a method 400 for performing an incremental backup of data in one or more virtual disks, according to one embodiment of the present disclosure. Incremental backups back up only those files and data that have changed since the last backup, whether the last backup was a full backup (i.e., as created in method 300) or a previous incremental backup. It should be recognized that techniques may be extended to create differential backups, which refer to backups of only those files and data that have changed since the last full backup only.

At some subsequent time (i.e., $t=t_2$), backup agent 142 may initiate a process for an incremental backup. In some embodiments, backup agent 142 may initiate the incremental backup process after a pre-determined period of time or, in some embodiments, responsive to user input. It should be recognized that by the subsequent time (i.e., $t=t_2$), read and write operations may have been performed on virtual disk 124 during the operation of the virtual machine 116. As described above, write operations on virtual disk 124 may use copy-on-write (COW) techniques to record subsequently written blocks to new allocation blocks and update reference counts 210 of the previously referenced data blocks. As such, virtual disk 124 is depicted in FIG. 5B as having a modified block allocation map 502 and one or more modified data blocks 504 that reflect changes made to virtual disk 124.

Modified block allocation map 502 shown in FIG. 5B illustrates an exemplary range of scenarios for changed data blocks. In one scenario, an allocated data block may be trimmed by guest operating system 120. This may occur when guest operating system 120 deletes one or more files or other data, and passes a TRIM command to inform an underlying storage device (in fact, virtual hardware 118) which blocks of data are no longer considered in use and can be wiped internally. In the example shown, the logical block LBA-0 was allocated in FIG. 5A as depicted by the "A" notation, and is de-allocated in FIG. 5B as depicted by the "Ø" notation. Further, data block 502-1 has been discovered by the background retirement process described earlier, and has been de-allocated and the associated reference count has been set to zero.

In another scenario, an allocated data block may be changed or written over, for example, when an application or guest operating system 120 performs a write operation on existing logical blocks when saving a document. In the example shown, the logical block LBA-1 is allocated to data block 504-2 in FIG. 5A, and is modified at $t=t_2$ and allocated to a new data block 504-5 as depicted in FIG. 5B. Also depicted in FIG. 5B is previous data block 504-2 de-allocated and the associated reference count set to zero, having been discovered by the background retirement process described earlier. While not shown in FIG. 5B, it should be recognized that virtual disks may have one or more intermediary snapshots that continue to be reference data blocks shared with current virtual disks 124, 506.

In yet another scenario, an unallocated data block may be written to, for example, when an application or guest operating system 120 performs a write operation on an unallocated logical block when creating a new file. In the example shown, the logical block LBA-2 was unallocated in FIG. 5A as depicted by the "Ø" notation, and at $t=t_2$ is allocated to data block 504-4 as depicted in FIG. 5B with a "A" notation.

Finally, in some scenarios, an allocated data block may remain unchanged, as in the example of allocated logical block LBA-3, depicted in FIGS. 5A and 5B maintaining the "A" notation. Similarly, an unallocated data block may remain unchanged (i.e., unallocated), as in the example of unallocated logical block LBA-4, depicted in FIGS. 5A and 5B maintaining the "Ø" notation.

Referring back to FIG. 4, to initiate an incremental backup process, at step 402, backup agent 142 makes a new snapshot. Similar to the operation in step 304 above, at step 404, virtual disk layer 140 generates a new snapshot of the target virtual disk to be backed up. As shown in FIG. 5C, a new snapshot 510 is created that includes a copy of the updated block allocation map 144 as of time $t=t_2$ and is linked to virtual disk 124.

At step 406, backup agent 142 uses virtual disk layer 140 to compare new snapshot 510 and previous (retired) snapshot 506, and retrieve data blocks that have changed between new snapshot 510 and previous snapshot 506. In some embodiments, backup agent 142 may request virtual disk layer 140 to retrieve data blocks and pass references or identifiers to particular retired snapshots to accomplish the desired comparison.

At step 408, virtual disk layer 140 compares retired block allocation map 508 of previous, retired snapshot 506 to block allocation map 512 of the new snapshot to determine which data blocks have changed between the two snapshots (i.e., since the last full or incremental backup). Virtual disk layer 140 can infer the changed data blocks using the retired snapshot according to logic listed below in Table 1.

TABLE 1

New Snapshot versus Previous Snapshot Comparison

| New Snapshot | Prev. Snapshot | Result |
| --- | --- | --- |
| Allocated (A) | Allocated (A) | Write block on Compare |
| Allocated (A) | Trimmed (T) | Write block |
| Allocated (A) | Unallocated (Ø) | Write block |
| Unallocated (Ø) | Trimmed (T) | De-allocate(Ø) |
| Unallocated (Ø) | Unallocated (Ø) | No change |

According to one embodiment, when the new snapshot and the previous snapshot both have allocated blocks for a corresponding entry in their block allocation maps, the result may be determined based on a "Write Block on Compare" function, as shown in Table 1, and is described as follows. If both allocation maps of the previous and new snapshot have the same block, then the block is omitted from the result. However, if the allocation maps of the previous and new snapshot have different data blocks (which may be enforced by the copy-on-write behavior of the block allocation maps), then the data block associated with the new snapshot is included in the result and written out. In one embodiment, the result is an accumulated set of allocated data blocks.

In the example shown in FIG. 5C, virtual disk layer 140 determines a de-allocate operation for logical block LBA-0 (i.e., dealloc (LBA-0)) because logical block LBA-0 in new snapshot 510 has been de-allocated and corresponding logical block LBA-0 in retired snapshot 506 had been trimmed. Regarding logical block LBA-1, virtual disk layer 140 determines contents of logical block LBA-1 from the new snapshot should be written (i.e., write (LBA-1, block-504-5)) to the incremental backup because logical block LBA-1 in new snapshot 510 has been allocated and is different than the data block and the logical block LBA-1 in retired snapshot 506 had been trimmed. Virtual disk layer 140 determines contents of logical block LBA-2 from the new snapshot should be written (i.e., write (LBA-2, block-504-4) to the incremental backup because the newer logical block LBA-2 has been allocated and changed (i.e., "A") and the previous logical block LBA-2 from retired snapshot 506 had not been unallocated (i.e., "Ø"). It should be recognized that even though contents of block allocation map 512 abstractly depict "A", "T", and "Ø" notation, the above-described write operations use physical block addresses found within entries of block allocation map 512 of the new snapshot.

Virtual disk layer 140 determines no changed data blocks for logical block LBA-3 (i.e., "no change") because even though the newer logical data block LBA-3 in snapshot 510 has been allocated, the data block has not been changed (i.e., "A" notation). Therefore, since the corresponding entry in retired block allocation map 508 contains the same physical block address (i.e., same "A" value), virtual disk layer 140 can infer that a copy of the contents of logical block LBA-3 is already being retained in backup storage, for example, in full backup 504. Virtual disk layer 140 further determines no changed data blocks for logical block LBA-4 (i.e., "no change") because corresponding entries in the newer block allocation map 512 and retired block allocation map 508 both indicate an unallocated block (i.e., "Ø").

At step 410, virtual disk layer 140 returns a copy of changed data blocks to backup agent 142, which at step 412, writes the data blocks to backup storage system 130 as an incremental backup. In the example shown in FIG. 5C, backup agent 142 writes the data blocks as an incremental backup 516 linked to full backup 504 which represents files and data which have changed since full backup 504 has made.

Figure 5D:
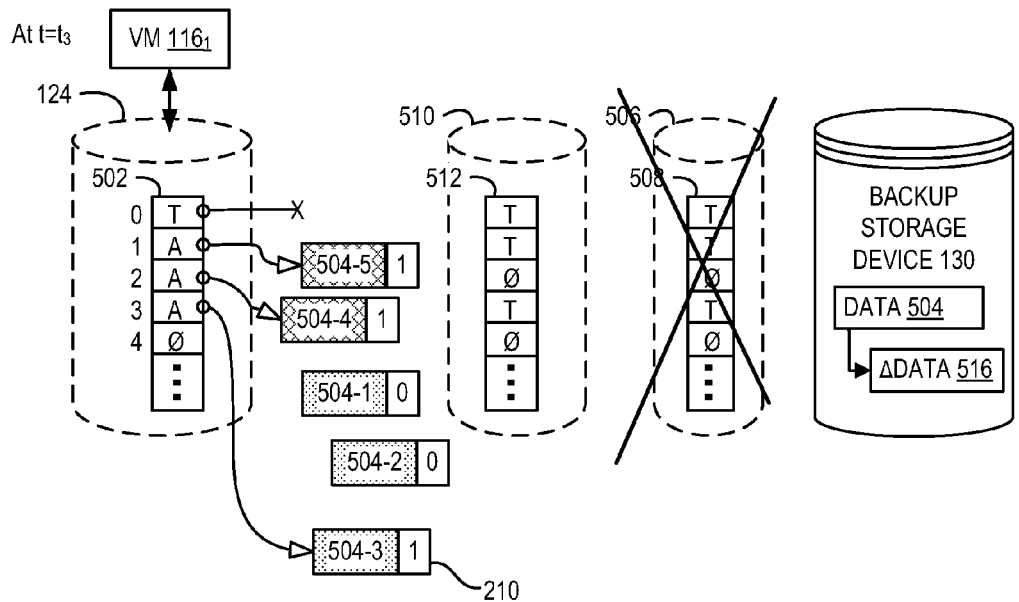

After the backup is complete, at step 414, backup agent 142 uses virtual disk layer 140 to delete the retired snapshot, and at step 418, retires the new snapshot, as depicted in FIG. 5D by a cross-out of retired snapshot 506.

Responsive to a request to delete the retired snapshot, at step 416, virtual disk layer 140, for each block in allocation map 508, de-allocates any data blocks in allocation map 508 of disk 506 that are not shared by other allocation maps (i.e., if the associated reference count 210 is equal to 1). After completion of this process, virtual disk layer 140 de-allocates block allocation map 508 and then deletes disk 506.

Responsive to a request to retire the new snapshot, virtual disk layer 140 performs a process similar to that described above in step 316 of method 300. Virtual disk layer 140 writes changes made after the snapshot back into the parent snapshot disk, thereby changing the state of the virtual machine to the current state. Then, at step 420, virtual disk layer 140 generates a new retired block allocation map 512 for the new retired snapshot. Virtual disk layer 140 deletes data blocks 514 associated with new snapshot 510. In some embodiments, virtual disk layer 140 uses a "TRIM" primitive to delete data blocks 504, which causes entries of block allocation map 512 corresponding to the deleted data blocks to be marked as unallocated, specifically, previously-allocated now de-allocated. In some embodiments, virtual disk layer 140 registers new snapshot 510 to a list for background processing of trimmed data blocks. As described earlier, virtual disk layer 140 may retain an internal copy of the retired block allocation map until a next incremental backup is made, or return the retired block allocation map to backup agent 142. It should be recognized that operations from step 402 to step 420 may repeat for each incremental backup made for one or more virtual disks.

Retired Snapshots of Virtual Disks Having Shared Allocation Maps Referencing Independent Data Blocks FIGS. 6A-6E are block diagrams depicting another embodiment of a block-addressable device, namely, virtual disk 600, for a virtual machine (e.g., VM $116_1$) having a block allocation map that maps logical block addresses to physical locations with storage. Virtual disk 600 includes a block allocation map 602 which is similar to block allocation map 144, and includes a plurality of entries 202 that represent a logical storage space for retaining content of blocks of data. Each entry 202 is associated with a logical block address (e.g., LBA-0 to LBA-N) that specifies a location with the logical storage space. Each entry 202 may have an address field 206 for a physical block address (PBA) that specifies the storage region containing a corresponding data block 604. In the example shown in FIG. 6A, LBA-0 points to the location for data block 604-2; LBA-1 points to the location for data block 604-1; LBA-3, data block 604-3.

Figure 6A:
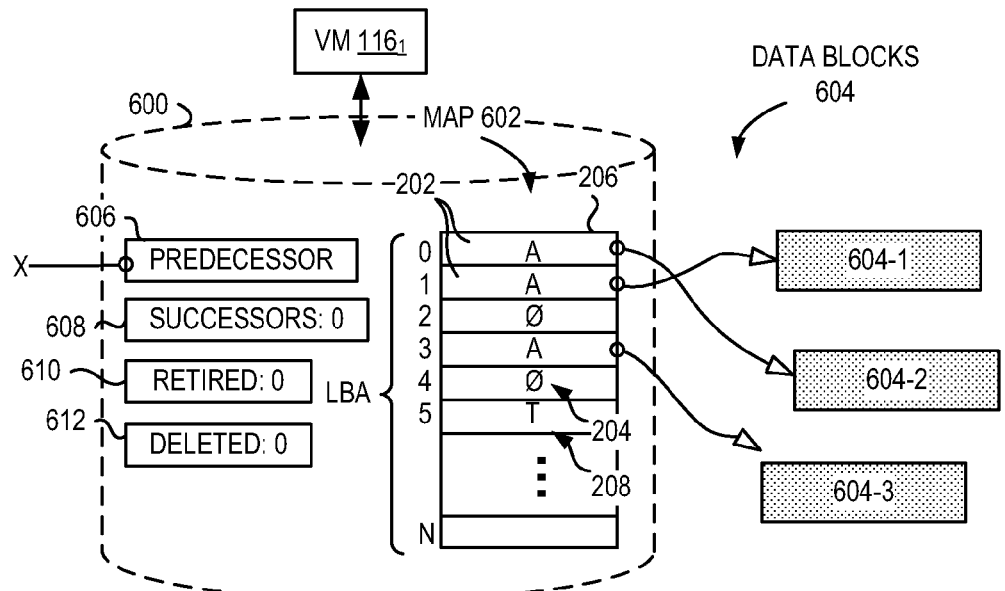
FIG. 6A to 6E are block diagrams depicting an alternative embodiment of a virtual disk having shared block allocation maps.

In one embodiment, entries 202 in block allocation map 602 may be marked as allocated, unallocated, and previously-allocated-now-de-allocated, similar to block allocation map 144. In one embodiment, an entry 202 may be marked as allocated simply by storing a physical block address in field 206, which is depicted in FIG. 6A with simply an "A" value to represent the block has been allocated and includes a physical block address for simplicity of illustration. An entry 202 may be marked as unallocated by storing a special or reserved value in physical block address field 206, for example, a Ø or NULL address 204. An entry 202 may be marked to indicate that a data block had been previously allocated and is now de-allocated, in contrast to a data block has never been allocated, by storing a special or reserved value 208, represented by the character T (i.e., for trimmed) in FIG. 6A.

Virtual disks 600 may be associated with other virtual disks in a predecessor-successor relationship. In one embodiment, virtual disk 600 includes a predecessor field 606 which references another virtual disk associated with virtual disk 600. Predecessor field 606 may have a null value for virtual disks that are a "base" or initial disk in a chain of virtual disks, as shown in FIG. 6A.

In one embodiment, virtual disk 600 may include a successors field 608, a retired field 610, and a deleted field 612. Successors field 608 may be a count of disks of which virtual disk 600 is a predecessor. Retired field 610 may be a state variable (e.g., bit flag) that is configured to indicate whether virtual disk 600 has been "retired". Deleted field 612 may be a state variable (e.g., bit) that is configured to indicate whether virtual disk 600 has been deleted. In some embodiments, retired field 610 and deleted field 612 may be initially cleared (e.g., set to a zero or null value), as depicted in FIG. 6A. While one particular embodiment of virtual disk 600 is depicted in FIG. 6A, it should be recognized that other implementations of described data structures may be utilized and are within the scope of the present disclosure. For example, retired field 610 and deleted fields 612 may be combined and implemented as a single multi-bit variable.

To create an incremental backup, backup agent 142 periodically creates a snapshot of virtual disk 600, compares the new snapshot to an earlier-created and retired snapshot, and copies changed data blocks to another storage device, such as backup storage system 130, similar to methods 300, 400 described earlier. In one embodiment, backup agent 142 may make at least one full backup of a virtual disk 600 selected as a subject for the backup procedure. Periodically or responsive to user input, backup agent 142 may use virtual disk layer 140 (e.g., via API call) to make an initial snapshot of virtual disk 600 that represents the state of virtual disk 600 at the time the snapshot was taken (i.e., at $t=t_1$).

Figure 6B:
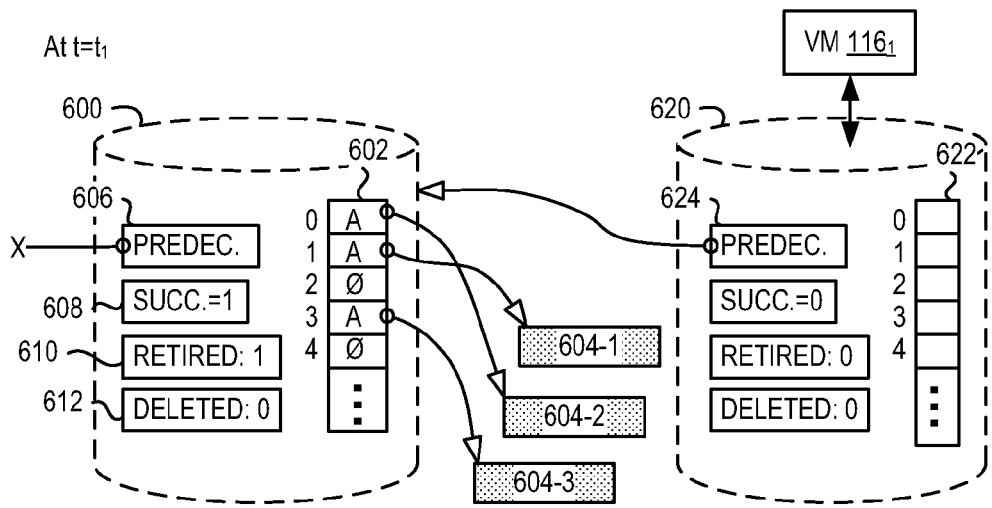

FIG. 6B depicts a block diagram of a snapshot taken of target virtual disk 600. In one embodiment, to take a snapshot of target virtual disk 600, virtual disk layer 140 creates a second virtual disk 620 having an empty block allocation map 622 and sets predecessor field 624 to specify virtual disk 600 as the predecessor of second virtual disk 620. While block allocation map 622 is depicted in FIG. 6B as empty, it should be appreciated that entries of block allocation map 622 may include special values (e.g., null values 208) indicating the block has never been allocated, and other default values. Virtual disk layer 140 updates the successors count of virtual disk 600 by incrementing successors field 608 (e.g., from 0 to 1). Virtual disk layer 140 designates second virtual disk 620 as the current disk for the VM (e.g., VM $116_1$), in place of target virtual disk 600, and designates target virtual disk 600 as the snapshot.

Backup agent 142 may use virtual disk layer 140 to read and retrieve all blocks from the initial snapshot (i.e., virtual disk 600) for a full backup. In one embodiment, to read a block from a disk having a shared block allocation map referencing data blocks (e.g., virtual disk 600), virtual disk layer 140 may determine whether block allocation map 602 is allocated and references a data block 604. If so, the contents of the data block are returned. Otherwise, if that logical block is unallocated, then the requested block is recursively fetched from a predecessor. If there is no predecessor, then it may be inferred that the data block was never allocated, and therefore, the read request returns a block of zeros. If a trimmed block is encountered, virtual disk layer 140 may raise an internal error. It should be recognized that the read operation described herein may be used to create full backups, incremental backups, and perform routine read operations during runtime of a VM.

Backup agent 142 copies the returned data blocks to backup storage system 130, thereby forming a full backup (not shown). Similar to method 300, backup agent 142 may request virtual disk layer 140 to retire the initial snapshot (i.e., virtual disk 600).

To retire a disk, virtual disk layer 140 sets retired field 610 of a target virtual disk 600 to indicate virtual disk 600 has been retired. Virtual disk layer 140 then selectively cleans up and trims data blocks of virtual disk 600 based on whether virtual disk 600 has successor virtual disks that might rely on data blocks referenced by block allocation map 602 of virtual disk 600. In one embodiment, responsive to determining virtual disk 600 has no successors (i.e., "successors" field 608 is equal to zero), virtual disk layer 140 de-allocates all allocated data blocks referenced by block allocation map 602, marking the de-allocated data block as trimmed. Responsive to determining virtual disk 600 has a successor (i.e., "successors" field 608 is equal to 1), virtual disk layer 140 selectively trims data blocks of virtual disk 600 based on whether successive virtual disks have "newer" corresponding data blocks allocated or whether successive virtual disks continue to rely on underlying data blocks of virtual disk 600. In one embodiment, for the chain of predecessors starting at the current disk (e.g., virtual disk 620), for each predecessor block that is allocated, virtual disk layer 140 de-allocates and trims that retiree block. In FIG. 6B, virtual disk 620 has no block allocated within block allocation map 622, and as such no blocks are trimmed from retired virtual disk 600.

At some subsequent time (i.e., $t=t_2$), backup agent 142 may initiate a process for an incremental backup. It should be recognized that by the subsequent time $t=t2$, read and write operations may have been performed on virtual disk 620 during runtime of the VM (e.g., VM 116$_1$). Read operations on a virtual disk having shared block allocation maps that reference each other proceed as described above. Write operations on virtual disks having shared block allocation maps is shown in greater detail in FIG. 7.

Figure 7:
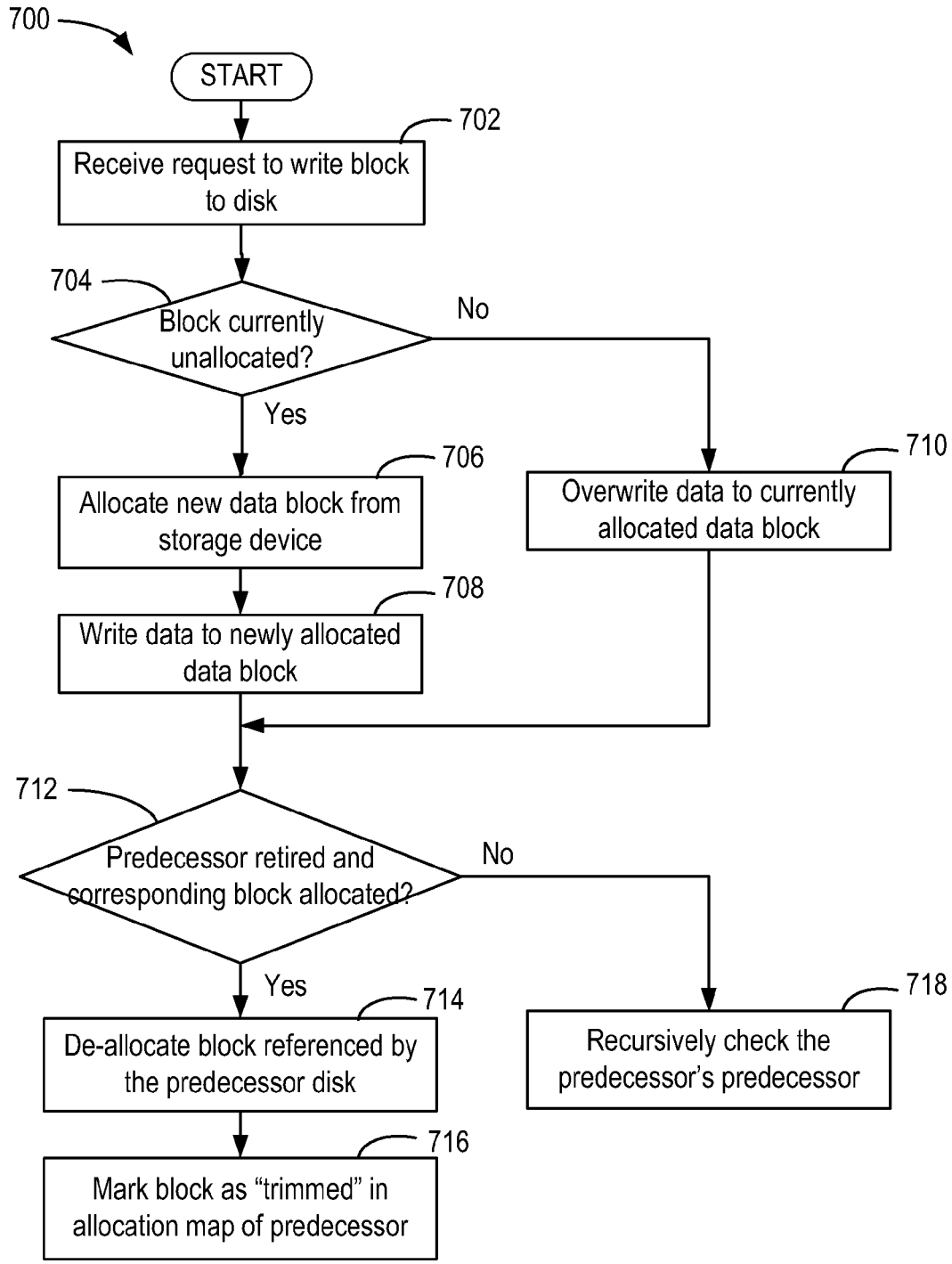
FIG. 7 is a flow diagram illustrating a method for performing write operations on a virtual disk having shared block allocation maps and which may reference other virtual disks, according to one embodiment of the present disclosure.

FIG. 7 is a flow diagram illustrating a method 700 for performing write operations on a virtual disk having shared block allocation maps and which may reference other virtual disks, according to one embodiment of the present disclosure. At step 702, virtual disk layer 140 receives a request to write a data block to a given disk (e.g., virtual disk 620).

At step 704, virtual disk layer 140 determines whether the data block is currently unallocated. If so, at step 706, virtual disk layer 140 allocates a new data block from the underlying storage device (e.g., storage 104), and at step 708, writes the data to that new data block. Otherwise, at step 710, virtual disk layer 140 overwrites data to the currently allocated data block.

Figure 6C:
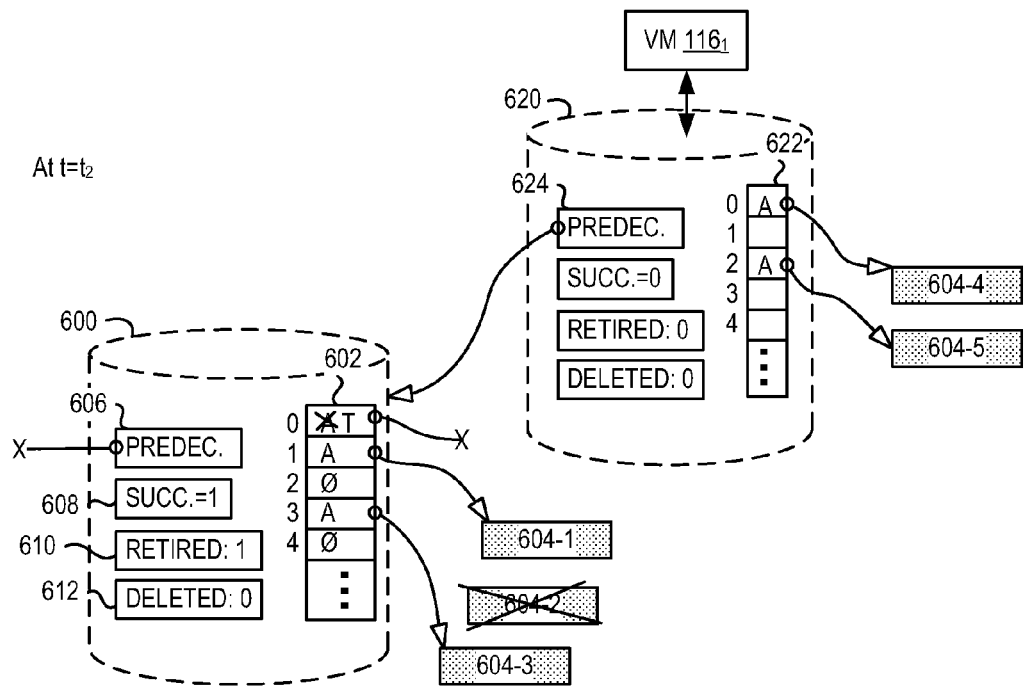

For example, as shown in FIG. 6C, responsive to a request to write in LBA-0 of virtual disk 620, virtual disk layer 140 allocates a new data block 604-4, modifies block allocation map 622 to reference new data block 604-4, and writes data to block 604-4, as depicted by the A notation within LBA0 of block allocation map 622. It should be recognized that this example illustrates writing a block when an existing data block 604-2 is already allocated for a predecessor disk 600. In another example, responsive to a request to write in a LBA2, virtual disk layer 140 allocates a new data block 604-5, write data to the new block, and updates block allocation map 622. It should be recognized that this example illustrates writing to a block that has never been allocated in predecessor disks (i.e., corresponding logical block LBA2 in predecessor disk 600 has a special value 204 or null character Ø).

Referring back to FIG. 7, virtual disk layer 140 proceeds to selectively trim data blocks of predecessor disks that are no longer relied upon by successor disks. In one embodiment, at step 712, virtual disk layer 140 determines whether the predecessor disk of the current disk is retired, and the corresponding block of the predecessor disk is allocated. If so, at step 714, virtual disk layer 140 de-allocates the block referenced by the predecessor and, at step 716, marks the block as trimmed within in the allocation map of the predecessor disk. It should be recognized that de-allocation of a data block may include invoking a TRIM operation of the block-addressable device, if the device supports such an operation. Otherwise, if the correspond block of the predecessor disk is not allocated (including not trimmed), at step 718, then virtual disk layer 140 recursively checks the predecessor disk's predecessor.

In the example shown in FIG. 6C, when processing write operation to LBA0, virtual disk layer 140 determines that predecessor disk 600 of current disk 620 is retired based on the value of retired field 610. Further, virtual disk layer 140 determines that the corresponding block LBA0 of block allocation map 602 is allocated. As such, virtual disk layer 140 de-allocates data block 604-2, and marks the data block as trimmed within block allocation map 602.

In another example shown in FIG. 6C, when processing write operation on LBA2, virtual disk layer 140 determines that predecessor disk 600 of current disk 620 is retired but the corresponding block LBA2 of block allocation map 602 is not allocated. Virtual disk layer 140 proceeds to recursively check the predecessor disk of predecessor disk 600. However, since predecessor field 606 has a null value (i.e., virtual disk 600 is an initial or base disk), virtual disk layer 140 takes no further action.

Figure 6D:
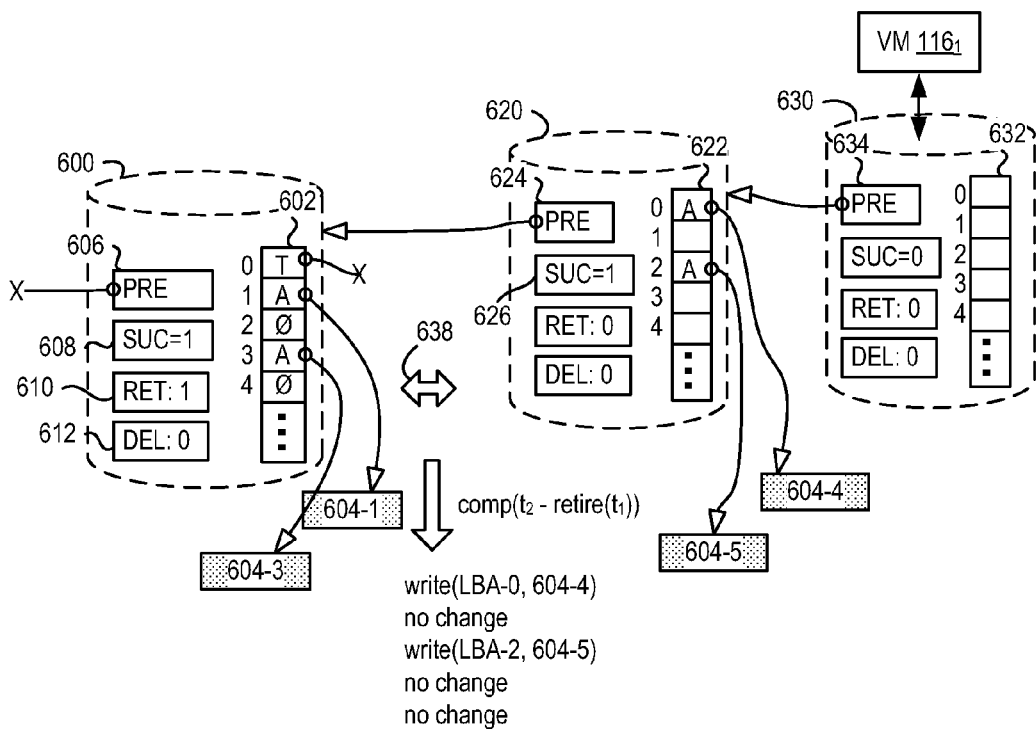

Referring back to the incremental backup process, to initiate an incremental backup process at a subsequent time t2, backup agent 142 makes a new snapshot. As shown in FIG. 6D, virtual disk layer 140 creates a new virtual disk 630 having an empty allocation map 632 and that references virtual disk 620 (via predecessor field 634) and designates virtual disk 630 as the current disk for VM 116$_1$. Virtual disk layer 140 increments "successors" field 626 of virtual disk 620 and designates virtual disk 620 as the new snapshot.

Backup agent 142 may use virtual disk layer 140 to compare a new snapshot (e.g., virtual disk 620) with a previous retired snapshot (e.g., virtual disk 600) and retrieve a result set comprising data blocks that have changed between snapshots. In one embodiment, to compare a first virtual disk against a second virtual disk, virtual disk layer 140 first determines whether there is any predecessor chain from the first virtual disk to the second virtual disk. In many cases, the first virtual disk may be considered the later, more recent snapshot, and the second virtual disk is the earlier, less recent snapshot, although any virtual disks in any order may be compared for various effects. If no chain exists, virtual disk layer 140 may raise an error. Otherwise, virtual disk layer 140 proceeds as follows.

In one embodiment, for the chain of predecessors starting from the first virtual disk through to, but not including, the second virtual disk, virtual disk layer 140 processes each block in the block allocation map of the "current" predecessor. In some embodiments, responsive to determining that a block in the block allocation map is allocated, that block may be added to the result set if that block address is not already in the result set. In some embodiments, responsive to determining that a block in the block allocation map is unallocated, that block may be skipped. In some embodiments, responsive to determining that a block in the block allocation map has been trimmed, an error may be raised, because only the oldest disk in the chain may be trimmed. Virtual disk layer 140 returns the result set comprising the accumulated set of allocated blocks determined based on the comparison between snapshots.

In the example shown in FIG. 6D, virtual disk layer 140 may compare virtual disk 620 against retired virtual disk 600, as depicted by arrow 638. Starting from the chain of predecessors from virtual disk 620 through to, but not including, virtual disk 600 (i.e., a chain containing just virtual disk 620), virtual disk layer 140 processes each block in block allocation map 622 of the "current" predecessor (i.e., virtual disk 620). Virtual disk layer 140 determines that LBA-0 and LBA-2 of block allocation map 622 are allocated, and therefore, includes data blocks 604-4 and 604-5 into a result set. Virtual disk layer 140 skips LBA-1, LBA-3, and LBA-4 of block allocation map 622 because LBA-1, LBA-3, and LBA-4 are unallocated in block allocation map 622. In one embodiment, backup agent 142 may write data blocks 604-4 and 604-5 as an incremental backup linked to the full backup, which represents file and data which have changed since the full backup has been made, to backup storage system 130.

In one embodiment, backup agent 140 may then deletes the previous retired snapshot, for example, virtual disk 600. A delete operation on virtual disks having shared block allocation maps is shown in greater detail in FIG. 8.

Figure 8:
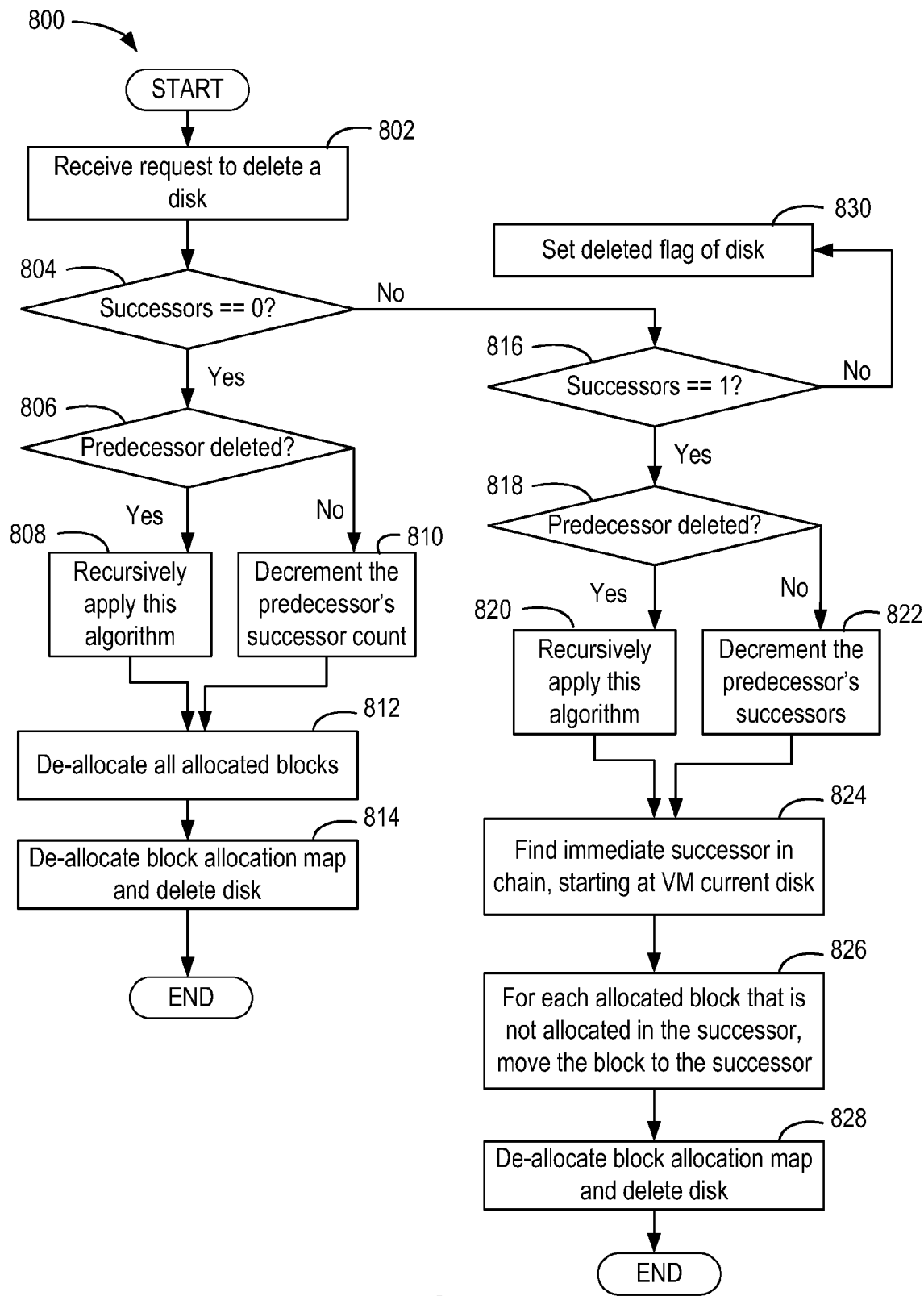
FIG. 8 is a flow diagram illustrating a method for deleting a virtual disk having shared block allocation maps and which may reference other virtual disks, according to one embodiment of the present disclosure.

FIG. 8 is a flow diagram illustrating a method 800 for deleting a virtual disk having shared block allocation maps and which may reference other virtual disks, according to one embodiment of the present disclosure. Method 800 describes a technique to delete a disk and update any related block allocation maps (e.g., related via predecessor and successors fields) to maintain a coherent state of data stored in virtual disks. In some embodiments, method 800 performs bookkeeping upon a target virtual disk to be deleted, which may include propagating data in block allocation maps up the chain of predecessors.

At step 802, virtual disk layer 140 receives a request to delete a target virtual disk (e.g., virtual disk 600). At step 804, virtual disk layer 140 determines whether the target virtual disk has no successors by checking if successors field 608 is equal to zero. If there are no successors (i.e., successors=0), at step 806, virtual disk layer 140 determines whether the predecessor disk has been marked as deleted (i.e., via deleted field 612). If not deleted, at step 808, virtual disk layer 140 updates the predecessor disk by updating the predecessor disk's "successors" field to represent the target disk is being deleted, for example, by decrementing the predecessor disk's "successors" field. Otherwise, if the predecessor is marked deleted, at step 810, virtual disk layer 140 recursively applies the algorithm described in method 800 to the predecessor disk marked deleted.

At step 812, virtual disk layer 140 de-allocates all allocated blocks in block allocation map of the target disk, which may include invoking a TRIM operation of the storage device. It has been determined that, because the target disk has no successors (e.g., in step 804), all allocated blocks of the target disk do not need to be propagated up any chain of virtual disks, and may be de-allocated. At step 814, virtual disk layer 140 may de-allocate the block allocation map of the target disk, and may complete deletion of the target disk (including any files related therewith).

At step 816, virtual disk layer 140 determines whether the target virtual disk has exactly one successor, for example, by checking successor field 608 is equal to 1. If there is one successor (i.e., successors=1), at step 818, virtual disk layer 140 determines whether the predecessor disk has been marked as deleted (i.e., via deleted field 612). If not deleted, at step 820, virtual disk layer 140 decrements the predecessor disk's successor field. Otherwise, if the predecessor disk is marked deleted, at step 822, virtual disk layer 140 recursively applies the algorithm described in method 800 to the predecessor disk marked deleted.

At step 824, virtual disk layer 140 finds an immediate successor to the target disk, starting at the current disk for the VM, based on the chain of virtual disks (e.g., via references in predecessor field 606). At step 826, for each allocated block in the block allocation map of the target disk that is not allocated in the immediate successor, virtual disk layer 140 moves the data block from the target disk to the successor. In some embodiments, virtual disk layer 140 moves or copies a physical block address of a data block allocated in the target disk to the corresponding entry in the block allocation map of the successor disk. This process ensures data blocks relied upon by successor disks continue to be persisted within the virtual disk after the base or predecessor disks have been deleted. At step 828, virtual disk layer 140 de-allocates the allocation map of the target disk, and completes deletion of the target disk, including any files related therewith. It should be recognized that the recursive operation of step 822 may result in movement of data blocks from predecessor disks to an immediate successor, and then to another immediate successor, and so forth, from multiple links down the chain of virtual disks.

At step 830, responsive to determining there are more than one successors to the target disk (i.e., successors not equal to either zero or one), virtual disk layer 140 sets deleted flag 612 of the target virtual disk.

Figure 6E:
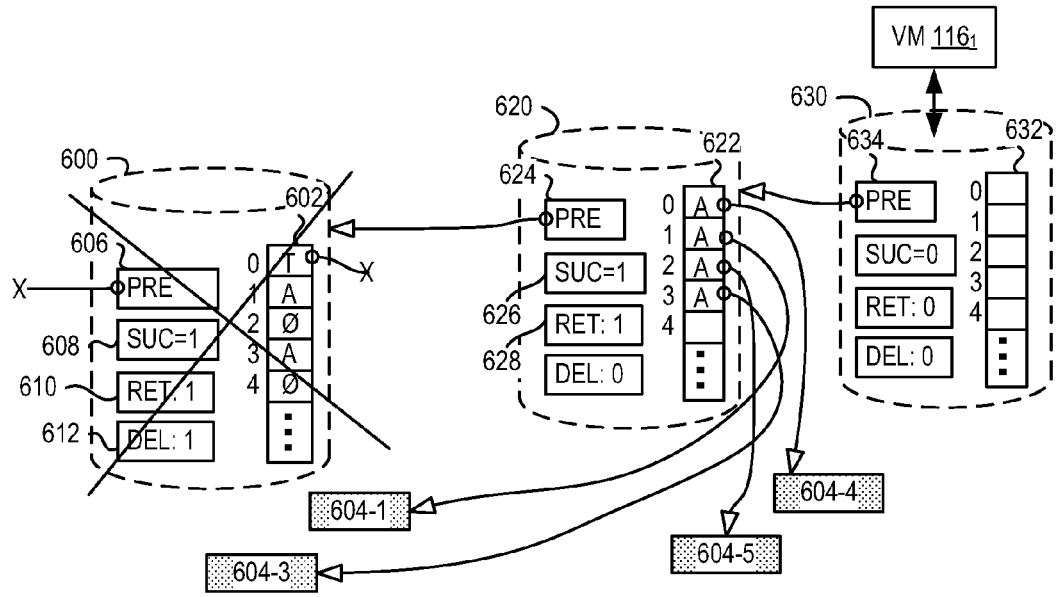

In the example shown in FIGS. 6D and 6E, the previously retired snapshot (i.e., virtual disk 600) is being deleted. Virtual disk layer 140 determines that virtual disk 600 has one successor (i.e., successor field 608 is equal to 1) and proceeds to update virtual disks. As there are no predecessors (i.e., predecessor field 606 is null), virtual disk layer 140 proceeds to find an immediate successor disk, starting at the current disk (e.g., virtual disk 630). Based on the chain of predecessors, virtual disk layer 140 identifies virtual disk 620 as being the immediate successor, and identifies blocks relied upon by the immediate successor. In the example shown, virtual disk layer 140 identifies blocks LBA-1 and LBA-3 allocated in block allocation map 602 that are not allocated in virtual disk 620 according to block allocation map 622. As such, data blocks 604-1 and 604-3, respectively, are moved to block allocation map 622 of the successor. FIG. 6E depicts LBA-1 and LBA-3 of block allocation map 622 having been updated to include physical block addresses to data blocks 604-1 and 604-3, respectively. In some implementations, physical block address for data blocks 604-1 and 604-3 may be moved to entries of block allocation map 622, while underlying data blocks remain in place on the underlying storage device (i.e., storage 104). In other implementations, data blocks 604-1 and 604-3 may be de-allocated using a TRIM operation, and corresponding new data blocks are allocated for the immediate successor disk.

In the example shown in FIG. 6E, because LBA-0 of block allocation map 622 has a data block allocated (i.e., "newer" data block 604-4), and a data block was trimmed for LBA-0 of block allocation map 602, no action may be needed for LBA-0. Similarly, because LBA-2 of block allocation map 622 has a data block 604-5 allocated, and a data block was never allocated for LBA-2 of block allocation map 602, no further action may be needed for LBA-1. Finally, because neither LBA-4 of block allocation map 622 nor LBA-2 of block allocation map 602 have ever been allocated (i.e., as represented by the null value), no further action may be needed for LBA-4.

In one embodiment, backup agent 140 may retire a new snapshot, for example, virtual disk 620, according to a similar process described earlier. In the example shown in FIG. 6E, virtual disk layer 140 sets retired field 628 of virtual disk 620 to indicate virtual disk 620 has been retired. Virtual disk layer 140 then selectively cleans up and trims data blocks of virtual disk 620 based on whether virtual disk 620 has successor virtual disks that might rely on data blocks referenced by block allocation map 622 of virtual disk 620. In FIG. 6E, the successor of retired virtual disk 620 (i.e., virtual disk 630) has no blocks allocated within block allocation map 632, and as such no blocks are trimmed from retired virtual disk 620.

Although discussed above in conjunction with a specific stack of virtualization layers, techniques described herein are not limited thereto and may be extended to embodiments where storage devices (e.g., storage 104) are configured to handle TRIM and other such operations. In such embodiments, one or more of the described operations of the virtual disk layer, for example, may be implemented and executed instead by the underlying physical storage device itself.

Figure 9:
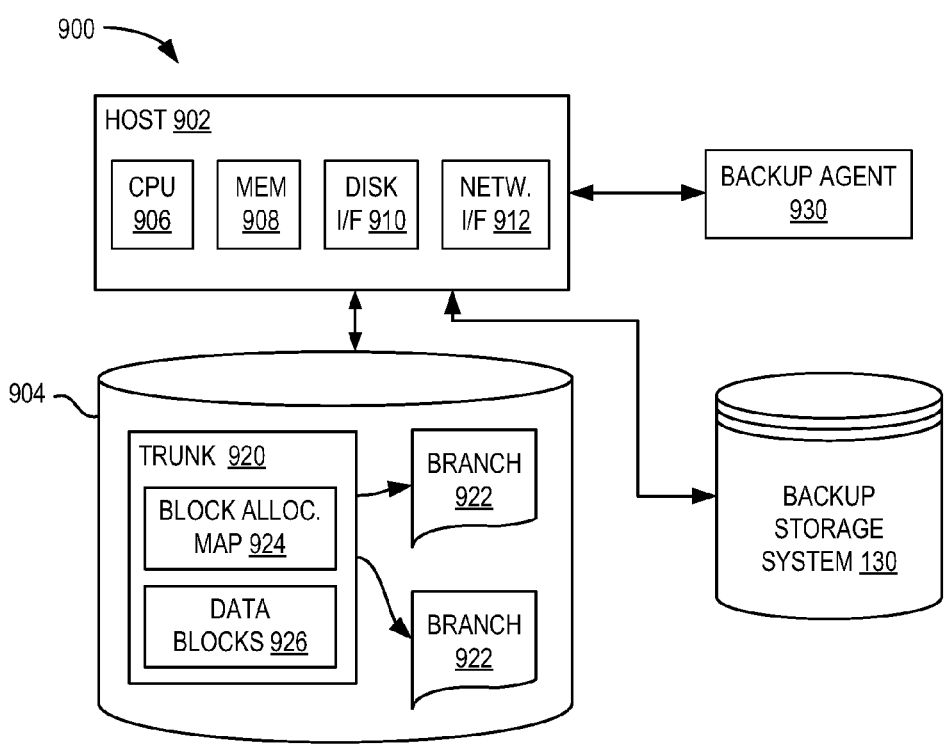
FIG. 9 is a block diagram that illustrates a computer system in which an alternative embodiment of the present disclosure may be utilized.

Furthermore, although discussed above primarily with respect to virtual disks associated with VMs, techniques discussed herein are not limited thereto and may be employed on any virtual disks, or generic files such as backup files, in computer systems generally. FIG. 9 is a block diagram depicting a computer system 900 configured to perform incremental backups according to one embodiment of the present disclosure. Computer system 900 may be similar to system 100 shown in FIG. 1, and includes host 902 that includes a hardware platform having a CPU 906, memory 908, disk interface 910, and network interface 912.

In one embodiment, host 902 is coupled to a storage device 904, similar to storage device 104 in FIG. 1. In one embodiment, storage device 904 may be a block-addressable device configured to quickly and efficiently make a "branch" 922 of storage device 904, by recording the logical block address of each block (e.g., data block 926) that has been written as of some moment in time (e.g., within block allocation map 924). In some embodiments, storage device 904 is further configured to capture the changes to the device after a particular moment by making a branch at that moment, then using copy-on-write techniques to record subsequently written blocks in the list of addresses for the branch and not the trunk 920 (or vice versa). In one embodiment, storage device 904 is configured to quickly and efficiently compare a branch 922 to a trunk 920 to discover exactly the list of addresses of changed blocks.

These features of branching and comparing branches are used, for example, to facilitate incremental backups. To create an incremental backup, a backup agent 930 periodically branches storage device 904, compares the new branch to an earlier-created branch, and copies the changed data blocks to backup storage system 930. In one embodiment, storage device 904 may be configured to provide functionality similar to virtual disk layer 140 such that branches 922 may be trimmed and retired and used as a basis for comparison in future incremental backups. Accordingly, storage device 904 need not retain an entire duplicate copy of the latest branch until the time of a next backup, to be a basis for comparison with the next backup, since the incremental backup made a copy of exactly that retained data to backup storage system 130 already.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for generating incremental backups for a virtual disk associated with a virtual machine, the method comprising:
   receiving a first request to take a snapshot of a current virtual disk at a first point in time when the current virtual disk is a first virtual disk, wherein the first virtual disk comprises a first plurality of data blocks and a first block allocation map having a first plurality of entries associated with the first plurality of data blocks;
   responsive to the first request, generating a second virtual disk comprising a reference to the first virtual disk and a second block allocation map having a second plurality of entries corresponding to the first plurality of entries, and designating the first virtual disk as the snapshot and the second virtual disk as the current virtual disk;
   storing a copy of the first plurality of data blocks in a second storage device;
   modifying an indication associated with the first virtual disk, wherein the indication represents that the first virtual disk has been retired;
   receiving a second request to take a snapshot of the current virtual disk at a second point in time when the current virtual disk is the second virtual disk;
   responsive to the second request, generating a third virtual disk comprising a reference to the second virtual disk and a third block allocation map having a third plurality of entries corresponding to the second plurality of entries, and designating the second virtual disk as the snapshot and the third virtual disk as the current virtual disk;
   determining changes to the first plurality of data blocks by examining the second block allocation map; and
   updating the copy of the first plurality of data blocks in the second storage device based on the determined changes.

2. The method of claim 1, wherein the generating the second virtual disk further comprises:
   incrementing a successors field of the first virtual disk, wherein the successors field comprises a count of virtual disks that succeed the first virtual disk.

3. The method of claim 1, wherein the reference to the first virtual disk comprises a predecessor field indicating the first virtual disk as a predecessor and the second virtual disk as a successor.

4. The method of claim 1, further comprising:
   writing data to a new data block associated with one of the second plurality of entries of the second block allocation map;
   responsive to determining the first virtual disk referenced by the second virtual disk has been retired and a corresponding data block of the first block allocation map has been allocated, de-allocating the corresponding data block of the first virtual disk; and
   modifying the first block allocation map to mark the de-allocated data block allocated then as trimmed.

5. The method of claim 1, wherein the modifying the indication associated with the first virtual disk further comprises:
   responsive to determining the first virtual disk has no successor virtual disks, de-allocating the first plurality of data blocks associated with the first virtual disk; and
   modifying the first block allocation map to mark the de-allocated data blocks as trimmed.

6. The method of claim 1, wherein the modifying the indication associated with the first virtual disk further comprises:
   responsive to determining the first virtual disk has one successor virtual disk, de-allocating at least one of the first plurality of data blocks based on the second block allocation map of the second virtual disk.

7. The method of claim 1, wherein each entry in the first block allocation map is associated with a logical block and comprises at least one of: a physical block address pointing to a physical data block, a reserved value indicating the logical block is unallocated, and a reserved value indicating the logical block has been allocated and subsequently trimmed.

8. The method of claim 1, wherein determining changes in the virtual disk based on the comparison of the second block allocation map against the first block allocation map further comprises:
   responsive to determining an entry in the second block allocation map indicates a data block has been allocated, including the data block in the generated backup.

9. The method of claim 1, wherein determining changes in the virtual disk based on the comparison of the second block allocation map against the first block allocation map further comprises:
   responsive to determining an entry in the second block allocation map indicates a data block has not been allocated, not including the data block in the generated backup.

10. A non-transitory computer-readable storage medium comprising instructions that, when executed in a computing device, generate incremental backups for a virtual disk associated with a virtual machine, by performing the steps of:
    receiving a first request to take a snapshot of a current virtual disk at a first point in time when the current virtual disk is a first virtual disk, wherein the first virtual disk comprises a first plurality of data blocks and a first block allocation map having a first plurality of entries associated with the first plurality of data blocks;
    responsive to the first request, generating a second virtual disk comprising a reference to the first virtual disk and a second block allocation map having a second plurality of entries corresponding to the first plurality of entries, and designating the first virtual disk as the snapshot and the second virtual disk as the current virtual disk;
    storing a copy of the first plurality of data blocks in a second storage device;
    modifying an indication associated with the first virtual disk, wherein the indication represents that the first virtual disk has been retired;
    receiving a second request to take a snapshot of the current virtual disk at a second point in time when the current virtual disk is the second virtual disk;

responsive to the second request, generating a third virtual disk comprising a reference to the second virtual disk and a third block allocation map having a third plurality of entries corresponding to the second plurality of entries, and designating the second virtual disk as the snapshot and the third virtual disk as the current virtual disk;

determining changes to the first plurality of data blocks by examining the second block allocation map; and updating the copy of the first plurality of data blocks in the second storage device based on the determined changes.

11. The non-transitory computer-readable storage medium of claim 10, wherein instructions for generating the second virtual disk further comprise instructions for:

incrementing a successors field of the first virtual disk, wherein the successors field comprises a count of virtual disks that succeed the first virtual disk.

12. The non-transitory computer-readable storage medium of claim 10, wherein the reference to the first virtual disk comprises a predecessor field indicating the first virtual disk as a predecessor and the second virtual disk as a successor.

13. The non-transitory computer-readable storage medium of claim 10, further comprising instructions for:

writing data to a new data block associated with one of the second plurality of entries of the second block allocation map;

responsive to determining the first virtual disk referenced by the second virtual disk has been retired and a corresponding data block of the first block allocation map has been allocated, de-allocating the corresponding data block of the first virtual disk; and modifying the first block allocation map to mark the de-allocated data block allocated then as trimmed.

14. The non-transitory computer-readable storage medium of claim 10, wherein the instructions for modifying the indication associated with the first virtual disk further comprise instructions for:

responsive to determining the first virtual disk has no successor virtual disks, de-allocating the first plurality of data blocks associated with the first virtual disk; and modifying the first block allocation map to mark the de-allocated data blocks as trimmed.

15. The non-transitory computer-readable storage medium of claim 10, wherein the instructions for modifying the indication associated with the first virtual disk further comprise instructions for:

responsive to determining the first virtual disk has one successor virtual disk, de-allocating at least one of the first plurality of data blocks based on the second block allocation map of the second virtual disk.

16. A computer system for generating incremental backups, the computer system comprising:

a first storage device having a first virtual disk associated with a virtual machine, wherein the first virtual disk comprises a first plurality of data blocks and a first block allocation map having a first plurality of entries associated with the first plurality of data blocks;

a second storage device; and a processor programmed to carry out the steps of:

generating a second virtual disk comprising a reference to the first virtual disk and a second block allocation map having a second plurality of entries corresponding to the first plurality of entries, and designating the first virtual disk as a snapshot and the second virtual disk as a current virtual disk;

storing a copy of the first plurality of data blocks in the second storage device;

modifying an indication associated with the first virtual disk, wherein the indication represents that the first virtual disk has been retired;

generating a third virtual disk comprising a reference to the second virtual disk and a third block allocation map having a third plurality of entries corresponding to the second plurality of entries, and designating the second virtual disk as the snapshot and the third virtual disk as the current virtual disk;

determining changes to the first plurality of data blocks by examining the second block allocation map; and updating the copy of the first plurality of data blocks in the second storage device based on the determined changes.

17. The computer system of claim 16, wherein the processor configured to generate the second virtual disk is further programmed to carry out the steps of:

incrementing a successors field of the first virtual disk, wherein the successors field comprises a count of virtual disks that succeed the first virtual disk.

18. The computer system of claim 16, wherein the processor is further programmed to carry out the steps of:

writing data to a new data block associated with one of the second plurality of entries of the second block allocation map;

responsive to determining the first virtual disk referenced by the second virtual disk has been retired and a corresponding data block of the first block allocation map has been allocated, de-allocating the corresponding data block of the first virtual disk; and modifying the first block allocation map to mark the de-allocated data block allocated then trimmed.

19. The computer system of claim 16, wherein the processor configured to modify the indication associated with the first virtual disk is further programmed to carry out the steps of:

responsive to determining the first virtual disk has no successor virtual disks, de-allocating the first plurality of data blocks associated with the first virtual disk; and modifying the first block allocation map to mark the de-allocated data blocks as trimmed.

20. The computer system of claim 16, wherein the processor configured to modify the indication associated with the first virtual disk is further programmed to carry out the steps of:

responsive to determining the first virtual disk has one successor virtual disk, de-allocating at least one of the first plurality of data blocks based on the second block allocation map of the second virtual disk.

* * * * *